United States Patent
Luo et al.

(10) Patent No.: US 10,285,103 B2
(45) Date of Patent: May 7, 2019

(54) RESOURCE ALLOCATION METHOD, SERVICE TRANSMISSION METHOD, AND APPARATUS

(71) Applicant: HUAWEI TECHNOLOGIES CO., LTD., Shenzhen (CN)

(72) Inventors: Haiyan Luo, Shanghai (CN); Hongzhuo Zhang, Shanghai (CN); Tianle Deng, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 104 days.

(21) Appl. No.: 15/435,792

(22) Filed: Feb. 17, 2017

(65) Prior Publication Data
US 2017/0164258 A1   Jun. 8, 2017

Related U.S. Application Data

(63) Continuation of application No. PCT/CN2014/084904, filed on Aug. 21, 2014.

(51) Int. Cl.
*H04W 36/22* (2009.01)
*H04W 28/16* (2009.01)
(Continued)

(52) U.S. Cl.
CPC .......... *H04W 36/22* (2013.01); *H04W 4/023* (2013.01); *H04W 16/14* (2013.01); *H04W 28/16* (2013.01); *H04W 28/08* (2013.01); *H04W 84/12* (2013.01)

(58) Field of Classification Search
CPC ..... H04W 36/22; H04W 36/14; H04W 4/023; H04W 84/12; H04W 88/06; H04W 28/08
See application file for complete search history.

(56) References Cited

U.S. PATENT DOCUMENTS 8,593,967 B2    11/2013  Fang
2011/0205921 A1*  8/2011  Hsu ................... H04L 43/0829
                                                  370/252
(Continued)

FOREIGN PATENT DOCUMENTS

CN    102340876 A    2/2012
CN    102685927 A    9/2012
(Continued)

OTHER PUBLICATIONS

Korean Office Action dated Feb. 19, 2018, in corresponding Korean Patent Application No. 10-2017-7007553, 8 pgs.
(Continued)

*Primary Examiner* — Jamal Javaid
(74) *Attorney, Agent, or Firm* — Staas & Halsey LLP

(57) ABSTRACT

The present invention relates to the field of mobile communications technologies, and in particular, to a resource allocation method, a service transmission method, and an apparatus, so as to resolve a technical problem of how to coordinately transmit, in a WLAN, a WLAN service and a to-be-offloaded service of a cellular network node. In embodiments of the present invention, resources separately allocated to an AP and the cellular network node are specified, and the AP and the cellular network node are separately notified of an allocation result. In this way, both the AP and the cellular network node transmit data on only the respective allocated WLAN resources, so as to avoid that the WLAN service and the to-be-offloaded service of the cellular network node contend for a channel.

20 Claims, 8 Drawing Sheets

(51) Int. Cl.
*H04W 4/02* (2018.01)
*H04W 16/14* (2009.01)
*H04W 84/12* (2009.01)
*H04W 28/08* (2009.01)

(56) References Cited

U.S. PATENT DOCUMENTS

| | | | |
|---|---|---|---|
| 2012/0015607 A1 | 1/2012 | Koskela et al. | |
| 2012/0113965 A1 | 5/2012 | Puthenpura et al. | |
| 2013/0287139 A1 | 10/2013 | Zhu et al. | |
| 2014/0036853 A1 | 2/2014 | Kim et al. | |
| 2014/0086211 A1 | 3/2014 | Liu et al. | |
| 2014/0169339 A1 | 6/2014 | Cheng et al. | |
| 2015/0071060 A1* | 3/2015 | Bhushan | H04W 74/08 370/230 |
| 2015/0282067 A1* | 10/2015 | Zhu | H04W 52/0206 370/311 |

FOREIGN PATENT DOCUMENTS

| | | |
|---|---|---|
| CN | 103038651 A | 4/2013 |
| CN | 103782622 A | 5/2014 |
| CN | 103987088 A | 8/2014 |
| KR | 10-2013-0086797 | 8/2013 |
| KR | 10-2014-0010450 | 1/2014 |
| WO | 2011/149533 A1 | 12/2011 |
| WO | 2011/157129 A2 | 12/2011 |
| WO | 2013/138708 A1 | 9/2013 |
| WO | 2013/149387 A1 | 10/2013 |

OTHER PUBLICATIONS

International Search Report dated May 27, 2015 in corresponding Application No. PCT/CN2014/084904.
Extended European Search Report dated Aug. 9, 2017 in corresponding European Patent Application No. 14900071.3.
International Search Report dated May 27, 2015 in corresponding International Application No. PCT/CN2014/084904.
Chinese Office Action dated Aug. 21, 2018 in corresponding Chinese Patent Application No. 201480033956.X, 7 pgs.

* cited by examiner

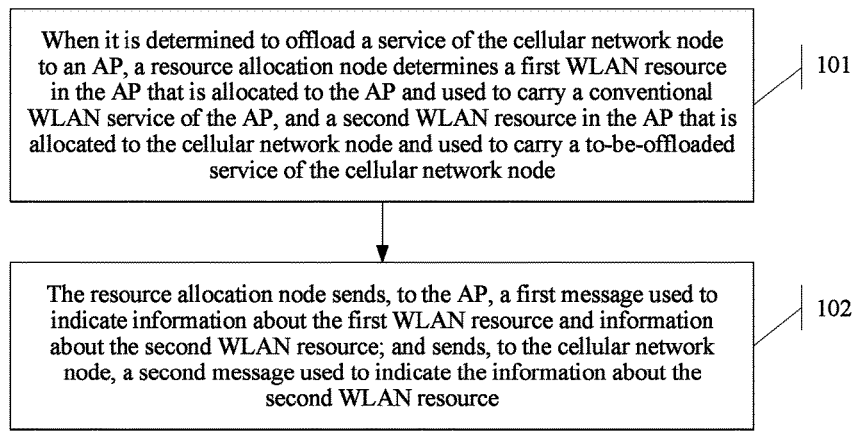

|  | Time domain 1 (40%) | Time domain 2 (30%) | Time domain 3 (30%) |
|---|---|---|---|
| Access point identifier | To-be-offloaded service of Long Term Evolution | To-be-offloaded service of the Universal Mobile Telecommunications System | Conventional wireless local area network service |

FIG. 3B

|  | Time domain 1 (50%) | Time domain 2 (50%) |
|---|---|---|
| Access point identifier | To-be-offloaded service of Long Term Evolution | To-be-offloaded service of the Universal Mobile Telecommunications System |

FIG. 3C

| Access point identifier | Channel 1 | Time domain 1 (40%) | Time domain 2 (30%) | Time domain 3 (30%) |
|---|---|---|---|---|
|  |  | To-be-offloaded service of Long Term Evolution | To-be-offloaded service of the Universal Mobile Telecommunications System | Conventional wireless local area network service |
|  | Channel 2 | Time domain 1 (30%) | Time domain 2 (70%) | |
|  |  | To-be-offloaded service of Long Term Evolution | Conventional wireless local area network service | |

FIG. 3D

|  | Time domain 1 (40%) | Time domain 2 (30%) | Time domain 3 (30%) |
|---|---|---|---|
| Access point identifier | To-be-offloaded service of Long Term Evolution cell 1 | To-be-offloaded service of Long Term Evolution cell 2 | Conventional wireless local area network service |

FIG. 3E

| | Time domain 1 (40%) | Time domain 2 (30%) | Time domain 3 (30%) |
|---|---|---|---|
| Access point identifier | To-be-offloaded service of Long Term Evolution | To-be-offloaded service of the Universal Mobile Telecommunications System | Conventional wireless local area network service |

When it is determined to offload a service of the cellular network node to an AP, the cellular network node receives a second message used to indicate information about a second WLAN resource, where the information about the second WLAN resource is information about a WLAN resource in the AP that is allocated to the cellular network node and used to carry a to-be-offloaded service of the cellular network node — 701

The cellular network node sends the second message to UE, where the second message is used by the UE to transmit the service according to the second message, and the UE is UE corresponding to the to-be-offloaded service of the cellular network node — 702

FIG. 7

FIG. 8

RESOURCE ALLOCATION METHOD, SERVICE TRANSMISSION METHOD, AND APPARATUS

CROSS-REFERENCE TO RELATED APPLICATIONS

This application is a continuation of International Application No. PCT/CN2014/084904, filed on Aug. 21, 2014, the disclosure of which is hereby incorporated by reference in its entirety.

TECHNICAL FIELD

The present invention relates to the field of communications technologies, and in particular, to a resource allocation method, a service transmission method, and an apparatus.

BACKGROUND

Currently, as mobile applications rapidly develop, mobile data traffic increases sharply. Consequently, it is increasingly difficult for a live network to meet a data traffic increase requirement. Therefore, a mobile operator expects to offload partial traffic of the live network to a non-3GPP (non-3rd Generation Partnership Project, non-3rd Generation Partnership Project) network, so as to relieve traffic load of the live network. Therefore, interworking (interworking) between a 3GPP network and a non-3GPP network, for example, interworking between an LTE (Long Term Evolution, Long Term Evolution) network and a WLAN (Wireless Local Area Network, wireless local area network) network, is a current research focus.

There are abundant unlicensed spectrum resources in the WLAN. To fully use the WLAN resources, a manner of interworking between a cellular network and the WLAN is used. On the one hand, the WLAN may still continue to transmit a conventional WLAN service; on the other hand, the cellular network may offload (offload) some services to the WLAN, so as to fully use the WLAN resources and increase a throughput.

In this case, if the WLAN does not distinguish between the conventional WLAN service and a to-be-offloaded service of the cellular network, the conventional WLAN service and the to-be-offloaded service contend for a channel, and more conflicts are introduced. Consequently, channel blocking occurs, and both the to-be-offloaded service of the cellular network and the WLAN service have poor user experience.

Therefore, how to coordinately transmit, in a WLAN, a conventional WLAN service and a to-be-offloaded service of a cellular network becomes an urgent problem to be resolved in interworking between the cellular network and the WLAN.

SUMMARY

Embodiments of the present invention provide a resource allocation method, a service transmission method, and an apparatus, so as to resolve a technical problem of how to coordinately transmit, in a WLAN, a WLAN service and a to-be-offloaded service of a cellular network.

A first aspect of the present invention provides a resource allocation method, including:

when it is determined to offload a service of the cellular network node to an access point AP, determining, by a resource allocation node, a first WLAN resource in the AP that is allocated to the AP and used to carry a conventional wireless local area network WLAN service of the AP, and a second WLAN resource in the AP that is allocated to the cellular network node and used to carry a to-be-offloaded service of the cellular network node; and sending, by the resource allocation node to the AP, a first message used to indicate information about the first WLAN resource and information about the second WLAN resource; and sending, to the cellular network node, a second message used to indicate the information about the second WLAN resource.

With reference to the first aspect, in a first possible implementation manner of the first aspect, the determining, by a resource allocation node, a first WLAN resource in the AP that is allocated to the AP and used to carry a conventional WLAN service of the AP, and a second WLAN resource in the AP that is allocated to the cellular network node and used to carry a to-be-offloaded service of the cellular network node includes:

receiving, by the resource allocation node, a correspondence that is between the AP and the cellular network node and reported by the cellular network node, where the correspondence is used to indicate that the cellular network node can offload a service of the cellular network node to the AP; and determining, by the resource allocation node according to the correspondence, the first WLAN resource in the AP allocated to the AP and the second WLAN resource in the AP allocated to the cellular network node.

With reference to the first aspect, in a second possible implementation manner of the first aspect, the determining, by a resource allocation node, a first WLAN resource in the AP that is allocated to the AP and used to carry a conventional WLAN service of the AP, and a second WLAN resource in the AP that is allocated to the cellular network node and used to carry a to-be-offloaded service of the cellular network node includes:

receiving, by the resource allocation node, signal strength of the AP that is reported by using the cellular network node by user equipment UE served by the cellular network node;

determining, by the resource allocation node, a correspondence between the AP and the cellular network node according to the signal strength of the AP, where the correspondence is used to indicate that the cellular network node can offload a service of the cellular network node to the AP; and determining, by the resource allocation node according to the correspondence, the first WLAN resource in the AP allocated to the AP and the second WLAN resource in the AP allocated to the cellular network node.

With reference to the first aspect, in a third possible implementation manner of the first aspect, the determining, by a resource allocation node, a first WLAN resource in the AP that is allocated to the AP and used to carry a conventional WLAN service of the AP, and a second WLAN resource in the AP that is allocated to the cellular network node and used to carry a to-be-offloaded service of the cellular network node includes:

determining, by the resource allocation node, a first position in which the AP is located and a second position in which the cellular network node is located; and if determining that a distance between the first position and second position is less than a preset distance, determining, by the resource allocation node, that there is a correspondence between the AP and the cellular network node; and determining, according to the correspondence, the first WLAN resource in the AP allocated to the AP and the second WLAN resource in the AP allocated to the cellular network node.

With reference to the first aspect, in a fourth possible implementation manner of the first aspect, the determining, by a resource allocation node, a first WLAN resource in the AP that is allocated to the AP and used to carry a conventional WLAN service of the AP, and a second WLAN resource in the AP that is allocated to the cellular network node and used to carry a to-be-offloaded service of the cellular network node includes:

receiving, by the resource allocation node, a first resource application that is reported by the cellular network node and used to apply for a WLAN resource in the AP to transmit the to-be-offloaded service of the cellular network node, and a second resource application that is reported by the AP and used to apply for a WLAN resource in the AP to transmit the conventional WLAN service of the AP; and determining, by the resource allocation node according to the first resource application and the second resource application, the first WLAN resource in the AP allocated to the AP and the second WLAN resource in the AP allocated to the cellular network node.

With reference to the first aspect, in a fifth possible implementation manner of the first aspect, the determining, by a resource allocation node, a first WLAN resource in the AP that is allocated to the AP and used to carry a conventional WLAN service of the AP, and a second WLAN resource in the AP that is allocated to the cellular network node and used to carry a to-be-offloaded service of the cellular network node includes:

receiving, by the resource allocation node, first load information that is reported by the cellular network node and corresponding to the service that the cellular network node determines to offload to the AP, and second load information reported by the AP; and determining, by the resource allocation node according to the first load information and the second load information, the first WLAN resource in the AP allocated to the AP and the second WLAN resource in the AP allocated to the cellular network node.

With reference to any one of the first aspect or the first possible implementation manner to the fifth possible implementation manner of the first aspect, in a sixth possible implementation manner of the first aspect, after the sending, by the resource allocation node to the AP, a first message used to indicate information about the first WLAN resource and information about the second WLAN resource, the method further includes:

receiving, by the resource allocation node, usage information of the first WLAN resource and the second WLAN resource that is reported by the AP.

A second aspect of the present invention provides a service transmission method, including:

receiving, by an access point AP, a first message sent by a resource allocation node, where the first message is used to indicate information about a first wireless local area network WLAN resource and information about a second WLAN resource, the information about the first WLAN resource is information about a WLAN resource in the AP that is allocated to the AP and used to carry a conventional WLAN service of the AP, and the information about the second WLAN resource is information about a WLAN resource in the AP that is allocated to the cellular network node and used to carry a to-be-offloaded service of the cellular network node;

allocating, by the AP, the first WLAN resource to the conventional WLAN service according to the first message, and allocating the second WLAN resource to the to-be-offloaded service of the cellular network node according to the first message; and transmitting, by the AP, the conventional WLAN service and the to-be-offloaded service of the cellular network node according to the allocated resources.

A third aspect of the present invention provides a service transmission method, including:

when it is determined to offload a service of the cellular network node to an access point AP, receiving, by the cellular network node, a second message used to indicate information about a second wireless local area network WLAN resource, where the information about the second WLAN resource is information about a WLAN resource in the AP that is allocated to the cellular network node and used to carry a to-be-offloaded service of the cellular network node; and sending, by the cellular network node, the second message to user equipment UE, where the second message is used by the UE to transmit the service according to the second message, and the UE is UE corresponding to the to-be-offloaded service of the cellular network node.

With reference to the third aspect, in a first possible implementation manner of the third aspect, after the receiving, by the cellular network node, a second message used to indicate information about a second WLAN resource, the method further includes: sending, by the cellular network node, an identity of the UE and convergence layer information of the UE to the AP, where the convergence layer information is used by the AP to send a data packet corresponding to the to-be-offloaded service of the cellular network node to a corresponding offloading layer of the cellular network node according to the convergence layer information after the data packet is processed, and the offloading layer is an offloading layer indicated by the convergence layer information.

A fourth aspect of the present invention provides a resource allocation node, including:

a determining module, configured to: when it is determined to offload a service of the cellular network node to an access point AP, determine a first WLAN resource in the AP that is allocated to the AP and used to carry a conventional wireless local area network WLAN service of the AP, and a second WLAN resource in the AP that is allocated to the cellular network node and used to carry a to-be-offloaded service of the cellular network node; and a sending module, configured to: send, to the AP, a first message used to indicate information about the first WLAN resource and information about the second WLAN resource; and send, to the cellular network node, a second message used to indicate the information about the second WLAN resource.

With reference to the fourth aspect, in a first possible implementation manner of the fourth aspect, the determining module is specifically configured to:

receive a correspondence that is between the AP and the cellular network node and reported by the cellular network node, where the correspondence is used to indicate that the cellular network node can offload a service of the cellular network node to the AP; and determine, according to the correspondence, the first WLAN resource in the AP allocated to the AP and the second WLAN resource in the AP allocated to the cellular network node.

With reference to the fourth aspect, in a second possible implementation manner of the fourth aspect, the determining module is specifically configured to:

receive signal strength of the AP that is reported by using the cellular network node by user equipment UE served by the cellular network node;

determine a correspondence between the AP and the cellular network node according to the signal strength of the AP, where the correspondence is used to indicate that the cellular network node can offload a service of the cellular network node to the AP; and determine, according to the correspondence, the first WLAN resource in the AP allocated to the AP and the second WLAN resource in the AP allocated to the cellular network node.

With reference to the fourth aspect, in a third possible implementation manner of the fourth aspect, the determining module is specifically configured to:

determine a first position in which the AP is located and a second position in which the cellular network node is located; and if determining that a distance between the first position and second position is less than a preset distance, determine that there is a correspondence between the AP and the cellular network node; and determine, according to the correspondence, the first WLAN resource in the AP allocated to the AP and the second WLAN resource in the AP allocated to the cellular network node.

With reference to the fourth aspect, in a fourth possible implementation manner of the fourth aspect, the determining module is specifically configured to:

receive a first resource application that is reported by the cellular network node and used to apply for a WLAN resource in the AP to transmit the to-be-offloaded service of the cellular network node, and a second resource application that is reported by the AP and used to apply for a WLAN resource in the AP to transmit the conventional WLAN service of the AP; and determine, according to the first resource application and the second resource application, the first WLAN resource in the AP allocated to the AP and the second WLAN resource in the AP allocated to the cellular network node.

With reference to the fourth aspect, in a fifth possible implementation manner of the fourth aspect, the determining module is specifically configured to:

receive first load information that is reported by the cellular network node and corresponding to the service that the cellular network node determines to offload to the AP, and second load information reported by the AP; and determine, according to the first load information and the second load information, the first WLAN resource in the AP allocated to the AP and the second WLAN resource in the AP allocated to the cellular network node.

With reference to any one of the fourth aspect or the first possible implementation manner to the fifth possible implementation manner of the fourth aspect, in a sixth possible implementation manner of the fourth aspect, the resource allocation node further includes a receiving module, configured to: after the sending module sends, to the AP, the first message used to indicate the information about the first WLAN resource and the information about the second WLAN resource, receive usage information of the first WLAN resource and the second WLAN resource that is reported by the AP.

A fifth aspect of the present invention provides an AP, including:

a receiving module, configured to receive a first message sent by a resource allocation node, where the first message is used to indicate information about a first wireless local area network WLAN resource and information about a second WLAN resource, the information about the first WLAN resource is information about a WLAN resource in the AP that is allocated to the AP and used to carry a conventional WLAN service of the AP, and the information about the second WLAN resource is information about a WLAN resource in the AP that is allocated to the cellular network node and used to carry a to-be-offloaded service of the cellular network node;

an allocation module, configured to: allocate the first WLAN resource to the conventional WLAN service according to the first message, and allocate the second WLAN resource to the to-be-offloaded service of the cellular network node according to the first message; and a transmission module, configured to transmit the conventional WLAN service and the to-be-offloaded service of the cellular network node according to the allocated resources.

A sixth aspect of the present invention provides a cellular network node, including:

a receiving module, configured to: when it is determined to offload a service of the cellular network node to an access point AP, receive a second message used to indicate information about a second wireless local area network WLAN resource, where the information about the second WLAN resource is information about a WLAN resource in the AP that is allocated to the cellular network node and used to carry a to-be-offloaded service of the cellular network node; and a sending module, configured to send the second message to user equipment UE, where the second message is used by the UE to transmit the service according to the second message, and the UE is UE corresponding to the to-be-offloaded service of the cellular network node.

With reference to the sixth aspect, in a first possible implementation manner of the sixth aspect, the sending module is further configured to send an identity of the UE and convergence layer information of the UE to the AP after the receiving module receives the second message used to indicate the information about the second WLAN resource, where the convergence layer information is used by the AP to send a data packet corresponding to the to-be-offloaded service of the cellular network node to a corresponding offloading layer of the cellular network node according to the convergence layer information after the data packet is processed, and the offloading layer is an offloading layer indicated by the convergence layer information.

A seventh aspect of the present invention provides a resource allocation node, including:

a memory, configured to store an instruction;

a processor, configured to execute the instruction to: when it is determined to offload a service of the cellular network node to an access point AP, determine a first WLAN resource in the AP that is allocated to the AP and used to carry a conventional wireless local area network WLAN service of the AP, and a second WLAN resource in the AP that is allocated to the cellular network node and used to carry a to-be-offloaded service of the cellular network node; and a transmitter, configured to: send, to the AP, a first message used to indicate information about the first WLAN resource and information about the second WLAN resource;

and send, to the cellular network node, a second message used to indicate the information about the second WLAN resource.

With reference to the seventh aspect, in a first possible implementation manner of the seventh aspect, the resource allocation node further includes a receiver, and the processor is specifically configured to:

execute the instruction to receive, by using the receiver, a correspondence that is between the AP and the cellular network node and reported by the cellular network node, where the correspondence is used to indicate that the cellular network node can offload a service of the cellular network node to the AP; and determine, according to the correspondence, the first WLAN resource in the AP allocated to the AP and the second WLAN resource in the AP allocated to the cellular network node.

With reference to the seventh aspect, in a second possible implementation manner of the seventh aspect, the resource allocation node further includes a receiver, and the processor is specifically configured to:

execute the instruction to receive, by using the receiver, signal strength of the AP that is reported by using the cellular network node by user equipment UE served by the cellular network node;

determine a correspondence between the AP and the cellular network node according to the signal strength of the AP, where the correspondence is used to indicate that the cellular network node can offload a service of the cellular network node to the AP; and determine, according to the correspondence, the first WLAN resource in the AP allocated to the AP and the second WLAN resource in the AP allocated to the cellular network node.

With reference to the seventh aspect, in a third possible implementation manner of the seventh aspect, the processor is specifically configured to:

execute the instruction to determine a first position in which the AP is located and a second position in which the cellular network node is located; and if determining that a distance between the first position and second position is less than a preset distance, determine that there is a correspondence between the AP and the cellular network node; and determine, according to the correspondence, the first WLAN resource in the AP allocated to the AP and the second WLAN resource in the AP allocated to the cellular network node.

With reference to the seventh aspect, in a fourth possible implementation manner of the seventh aspect, the resource allocation node further includes a receiver, and the processor is specifically configured to:

execute the instruction to receive, by using the receiver, a first resource application that is reported by the cellular network node and used to apply for a WLAN resource in the AP to transmit the to-be-offloaded service of the cellular network node, and a second resource application that is reported by the AP and used to apply for a WLAN resource in the AP to transmit the conventional WLAN service of the AP; and determine, according to the first resource application and the second resource application, the first WLAN resource in the AP allocated to the AP and the second WLAN resource in the AP allocated to the cellular network node.

With reference to the seventh aspect, in a fifth possible implementation manner of the seventh aspect, the resource allocation node further includes a receiver, and the processor is specifically configured to:

execute the instruction to receive, by using the receiver, first load information that is reported by the cellular network node and corresponding to the service that the cellular network node determines to offload to the AP, and second load information reported by the AP; and determine, according to the first load information and the second load information, the first WLAN resource in the AP allocated to the AP and the second WLAN resource in the AP allocated to the cellular network node.

With reference to any one of the seventh aspect or the first possible implementation manner to the fifth possible implementation manner of the seventh aspect, in a sixth possible implementation manner of the seventh aspect, the resource allocation node further includes a receiver, configured to: after the transmitter sends, to the AP, the first message used to indicate the information about the first WLAN resource and the information about the second WLAN resource, receive usage information of the first WLAN resource and the second WLAN resource that is reported by the AP.

An eighth aspect of the present invention provides an AP, including:

a memory, configured to store an instruction;

a receiver, configured to receive a first message sent by a resource allocation node, where the first message is used to indicate information about a first wireless local area network WLAN resource and information about a second WLAN resource, the information about the first WLAN resource is information about a WLAN resource in the AP that is allocated to the AP and used to carry a conventional WLAN service of the AP, and the information about the second WLAN resource is information about a WLAN resource in the AP that is allocated to the cellular network node and used to carry a to-be-offloaded service of the cellular network node; and a processor, configured to execute the instruction to: allocate the first WLAN resource to the conventional WLAN service according to the first message, and allocate the second WLAN resource to the to-be-offloaded service of the cellular network node according to the first message; and transmit the conventional WLAN service and the to-be-offloaded service of the cellular network node according to the allocated resources.

A ninth aspect of the present invention provides a cellular network node, including:

a receiver, configured to: when it is determined to offload a service of the cellular network node to an access point AP, receive a second message used to indicate information about a second wireless local area network WLAN resource, where the information about the second WLAN resource is information about a WLAN resource in the AP that is allocated to the cellular network node and used to carry a to-be-offloaded service of the cellular network node; and a transmitter, configured to send the second message to user equipment UE, where the second message is used by the UE to transmit the service according to the second message, and the UE is UE corresponding to the to-be-offloaded service of the cellular network node.

With reference to the ninth aspect, in a first possible implementation manner of the ninth aspect, the transmitter is further configured to send an identity of the UE and convergence layer information of the UE to the AP after the receiver receives the second message used to indicate the information about the second WLAN resource, where the convergence layer information is used by the AP to send a data packet corresponding to the to-be-offloaded service of the cellular network node to a corresponding offloading layer of the cellular network node according to the convergence layer information after the data packet is processed, and the offloading layer is an offloading layer indicated by the convergence layer information.

In the embodiments of the present invention, it is required to determine the first WLAN resource in the AP allocated to the AP and the second WLAN resource in the AP allocated to the cellular network node, that is, specify WLAN resources separately allocated in the AP to a conventional WLAN service of the AP and a to-be-offloaded service of the cellular network node, and to separately notify the AP and the cellular network node of an allocation result. In this way, both the conventional WLAN service and the to-be-offloaded service of the cellular network node are transmitted on only the respective allocated WLAN resources, so as to avoid that the WLAN service and the to-be-offloaded service of the cellular network node contend for a channel. Therefore, not only all data can be transmitted, but also data transmission smoothness can be ensured as much as possible, so as to avoid channel blocking, improve data transmission efficiency, and improve user experience of the to-be-offloaded service of the cellular network node and the WLAN service.

BRIEF DESCRIPTION OF DRAWINGS

FIG. 1 is a main flowchart of a resource allocation method according to an embodiment of the present invention;

FIG. 2A is a first schematic diagram of a second resource allocation pattern according to an embodiment of the present invention;

FIG. 2B is a second schematic diagram of a second resource allocation pattern according to an embodiment of the present invention;

FIG. 3A is a first schematic diagram of a first resource allocation pattern according to an embodiment of the present invention;

FIG. 3B is a second schematic diagram of a first resource allocation pattern according to an embodiment of the present invention;

FIG. 3C is a third schematic diagram of a first resource allocation pattern according to an embodiment of the present invention;

FIG. 3D is a fourth schematic diagram of a first resource allocation pattern according to an embodiment of the present invention;

FIG. 3E is a fifth schematic diagram of a first resource allocation pattern according to an embodiment of the present invention;

FIG. 7 is a main flowchart of a service transmission method on a cellular network node side according to an embodiment of the present invention;

FIG. 8 is a main structural block diagram of a resource allocation node according to an embodiment of the present invention;

DESCRIPTION OF EMBODIMENTS

Figure 4A:
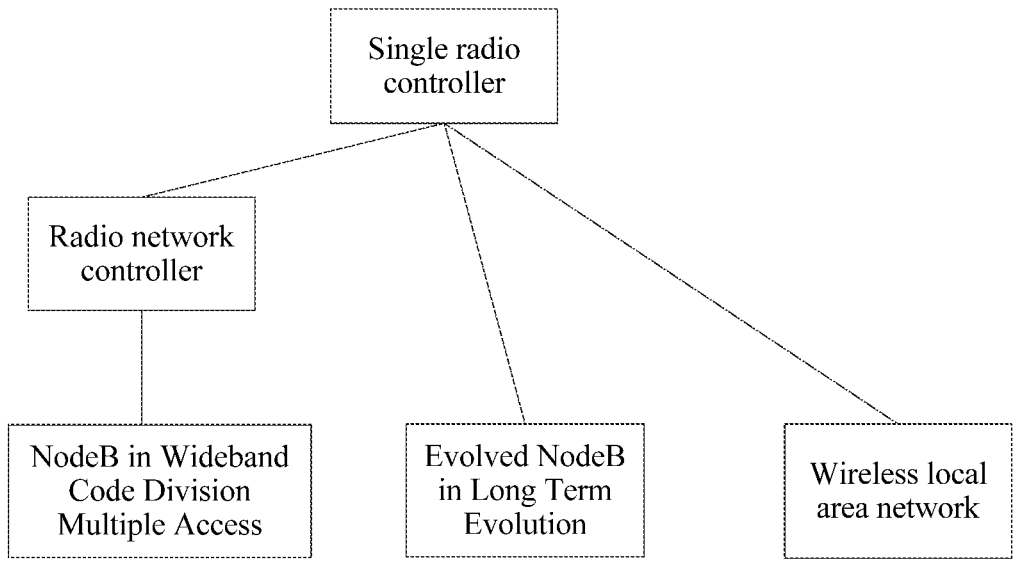
FIG. 4A is a basic architectural diagram when a resource allocation node is an SRC according to an embodiment of the present invention.

A resource allocation method in the embodiments of the present invention includes: when it is determined to offload a service of the cellular network node to an access point AP, determining, by a resource allocation node, a first WLAN resource in the AP that is allocated to the AP and used to carry a conventional wireless local area network WLAN service of the AP, and a second WLAN resource in the AP that is allocated to the cellular network node and used to carry a to-be-offloaded service of the cellular network node; and sending, by the resource allocation node to the AP, a first message used to indicate information about the first WLAN resource and information about the second WLAN resource, and sending, to the cellular network node, a second message used to indicate the information about the second WLAN resource.

In the embodiments of the present invention, it is required to determine the first WLAN resource in the AP allocated to the AP and the second WLAN resource in the AP allocated to the cellular network node, that is, specify WLAN resources separately allocated in the AP to the conventional WLAN service of the AP and the to-be-offloaded service of the cellular network node, and to separately notify the AP and the cellular network node of an allocation result. In this way, both the conventional WLAN service and the to-be-offloaded service of the cellular network node are transmitted on only the respective allocated WLAN resources, so as to avoid that the WLAN service and the to-be-offloaded service of the cellular network node contend for a channel. Therefore, not only all data can be transmitted, but also data transmission smoothness can be ensured as much as possible, so as to avoid channel blocking, improve data transmission efficiency, and improve user experience of the to-be-offloaded service of the cellular network node and the WLAN service.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Technologies described in this specification may be used in various communications systems, for example, current 2G and 3G communications systems and a next-generation communications system, for example, a global system for mobile communications (Global System for Mobile communications, GSM), a Code Division Multiple Access (Code Division Multiple Access, CDMA) system, a Time Division Multiple Access (Time Division Multiple Access, TDMA) system, Wideband Code Division Multiple Access (Wideband Code Division Multiple Access, WCDMA) system, a Frequency Division Multiple Access (Frequency Division Multiple Address, FDMA) system, an orthogonal frequency division multiple access (Orthogonal Frequency-Division Multiple Access, OFDMA) system, a single-carrier FDMA (SC-FDMA) system, a general packet radio service (General Packet Radio Service, GPRS) system, a Long Term Evolution (Long Term Evolution, LTE) system, and another communications system of this type.

This specification describes various aspects with reference to user equipment and/or a base station.

The user equipment may be a wireless terminal or may be a wired terminal. The wireless terminal may refer to a device that provides voice and/or data connectivity for a user, a handheld device with a radio connection function, or another processing device connected to a radio modem. The wireless terminal may communicate with one or more core networks by using a radio access network (for example, Radio Access Network, RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, that exchanges voice and/or data with the radio access network. For example, the wireless terminal may be a device such as a personal communications service (Personal Communications Service, PCS) phone, a cordless telephone set, a Session Initiation Protocol (SIP) phone, a wireless local loop (Wireless Local Loop, WLL) station, or a personal digital assistant (Personal Digital Assistant, PDA). The wireless terminal may also be referred to as a system, a subscriber unit (Subscriber Unit), a subscriber station (Subscriber Station), a mobile station (Mobile Station), a mobile station (Mobile), a remote station (Remote Station), an access point (Access Point), a remote terminal (Remote Terminal), an access terminal (Access Terminal), a user terminal (User Terminal), a user agent (User Agent), user device (User Device), or user equipment (User Equipment).

The base station (for example, an access point) may refer to a device that is in an access network and communicates, over an air interface, with the wireless terminal by using one or more sectors. The base station may be configured to mutually convert a received over-the-air frame and an IP packet and serve as a router between the wireless terminal and a rest portion of the access network. The rest portion of the access network may include an Internet protocol (IP) network. The base station may further coordinate attribute management of the air interface. For example, the base station may be a base transceiver station (Base Transceiver Station, BTS) in GSM or CDMA, or may be a NodeB (NodeB) in WCDMA, or may be an evolved NodeB (NodeB, eNB, or e-NodeB, evolved Node B) in LTE. This is not limited in this application.

In addition, the terms "system" and "network" in this specification may be used interchangeably in this specification. The term "and/or" in this specification describes an association relationship for describing associated objects and represents that three relationships may exist. For example, A and/or B may represent the following three cases: Only A exists, both A and B exists, and only B exists. In addition, unless otherwise stated, the character "/" in this specification generally indicates an "or" relationship between the associated objects.

In the embodiments of the present invention, the cellular network node may refer to, for example, an eNB, a NodeB, or an RNC (Radio Network Controller, radio network controller).

In the embodiments of the present invention, the resource allocation node may be specifically any one of an SRC (Single Radio Controller, single radio controller), an eNB, an RNC, a NodeB, an AC (Access Controller, access controller), or an AP (Access Point, access point).

For the cellular network node, the cellular network node offloads a service to the AP. For UE corresponding to the to-be-offloaded service of the cellular network node, the UE offloads the service to the AP.

In the embodiments of the present invention, the to-be-offloaded service of the cellular network node refers to a service to be offloaded by the cellular network node to the AP for transmission, and the conventional WLAN service refers to a service originally transmitted in the AP.

The following further describes the embodiments of the present invention in detail with reference to the accompanying drawings of this specification.

Referring to FIG. 1, an embodiment of the present invention provides a resource allocation method. A main procedure of the method is described as follows. In this embodiment of the present invention, a node may be set as a resource allocation node, and the method can be applied to the resource allocation node.

Step 101: When it is determined to offload a service of the cellular network node to an AP, the resource allocation node determines a first WLAN resource in the AP that is allocated to the AP and used to carry a conventional WLAN service of the AP, and a second WLAN resource in the AP that is allocated to the cellular network node and used to carry a to-be-offloaded service of the cellular network node.

In this embodiment of the present invention, the cellular network node may determine to offload a service of the cellular network node to the AP, or the resource allocation node may determine to offload a service of the cellular network node to the AP.

If it is determined to offload a service of the cellular network node to the AP, the resource allocation node may determine a WLAN resource that is allocated to the AP and used to carry the conventional WLAN service, and a WLAN resource that is allocated to the cellular network node and used to carry the to-be-offloaded service of the cellular network node. In this embodiment of the present invention, the WLAN resource allocated to the AP is referred to as the first WLAN resource, and the WLAN resource allocated to the cellular network node is referred to as the second WLAN resource.

In this embodiment of the present invention, the AP may refer to one AP, or may refer to multiple APs. Similarly, the cellular network node may refer to one cellular network node, or may refer to multiple cellular network nodes. For one cellular network node, the cellular network node may offload a service to one or more APs. The resource allocation node may determine offloading information of one cellular network node at a time, or may determine offloading information of multiple cellular network nodes at a time.

Specifically, if there is one AP, there may be one or more cellular network nodes. If there are multiple APs, there may be one or more cellular network nodes.

If there are one AP and one cellular network node, the resource allocation node determines the first WLAN resource in the AP that is allocated to the AP and used to carry the conventional WLAN service of the AP, and the second WLAN resource in the AP that is allocated to the cellular network node and used to carry the to-be-offloaded service of the cellular network node. In this case, the first WLAN resource and the second WLAN resource are corresponding to the same AP, and the second WLAN resource is corresponding to the same cellular network node.

If there are one AP and multiple cellular network nodes, the resource allocation node determines the first WLAN resource in the AP that is allocated to the AP and used to carry the conventional WLAN service of the AP, and separately determines a WLAN resource in the AP that is allocated to each cellular network node of the cellular network nodes and used to carry a to-be-offloaded service of the cellular network node. WLAN resources corresponding to all the cellular network nodes are collectively referred to as the second WLAN resource. In this case, both the first WLAN resource and the second WLAN resource are corresponding to the same AP, but the second WLAN resource is corresponding to the different cellular network nodes.

If there are multiple APs and one cellular network node, the resource allocation node separately determines a WLAN resource that is allocated to each AP of the APs and used to carry a conventional WLAN service of the AP. WLAN resources corresponding to all the APs are collectively referred to as the first WLAN resource. In addition, the resource allocation node determines the second WLAN resource in the APs allocated to the cellular network node. In this case, both the first WLAN resource and the second WLAN resource are corresponding to the different APs, but the second WLAN resource is corresponding to the same cellular network node. For example, if the AP includes an AP 1 and an AP 2, the resource allocation node separately determines a WLAN resource 1 in the AP 1 allocated to the AP 1 and a WLAN resource 2 in the AP 2 allocated to the AP 2. The WLAN resource 1 and the WLAN resource 2 form the first WLAN resource. In addition, the resource allocation node determines a WLAN resource 3 in the AP 1 allocated to the cellular network node and a WLAN resource 4 in the AP 2 allocated to the cellular network node. The WLAN resource 3 and the WLAN resource 4 form the second WLAN resource.

For example, there are two APs: an AP 1 and an AP 2, respectively, and one cellular network node. For example, the cellular network node is an eNB. It is assumed that the eNB learns in advance that five UEs in a cell 1 fall within a coverage area of the AP 1, and two UEs in a cell 2 fall within a coverage area of the AP 2. In this case, the eNB offloads a service of the cell 1 by using the AP 1, and offloads a service of the cell 2 by using the AP 2. For example, the eNB offloads, by using the AP 1, services of the five UEs in the cell 1. The second WLAN resource accounts for 40% of a total WLAN resource in the AP 1, and a conventional WLAN service in the AP 1 accounts for 60% of the total WLAN resource in the AP 1. The eNB offloads, by using the AP 2, services of the two UEs in the cell 2. The second WLAN resource accounts for 80% of a total WLAN resource in the AP 2, and a conventional WLAN service in the AP 2 accounts for 20% of the total WLAN resource in the AP 2.

If there are multiple APs and multiple cellular network nodes, the resource allocation node separately determines a WLAN resource that is allocated to each AP of the APs and corresponding to each AP. WLAN resources corresponding to all the APs are collectively referred to as the first WLAN resource. In addition, the resource allocation node separately determines a WLAN resource that is allocated to each cellular network node of the cellular network nodes and corresponding to each cellular network node. WLAN resources corresponding to all the cellular network nodes are collectively referred to as the second WLAN resource. In this case, both the first WLAN resource and the second WLAN resource are corresponding to the different APs, and the second WLAN resource is corresponding to the different cellular network nodes. For example, if the AP includes an AP 1 and an AP 2, and the cellular network node includes a cellular network node 1 and a cellular network node 2, the resource allocation node separately determines a WLAN resource 1 in the AP 1 allocated to the AP 1 and a WLAN resource 2 in the AP 2 allocated to the AP 2. The WLAN resource 1 and the WLAN resource 2 form the first WLAN resource. In addition, the resource allocation node determines a WLAN resource 3 in the AP 1 allocated to the cellular network node 1, a WLAN resource 4 in the AP 1 allocated to the cellular network node 2, a WLAN resource 5 in the AP 2 allocated to the cellular network node 1, and a WLAN resource 6 in the AP 2 allocated to the cellular network node 2. The WLAN resource 3, the WLAN resource 4, the WLAN resource 5, and the WLAN resource 6 form the second WLAN resource.

Optionally, in this embodiment of the present invention, there may be many different manners for determining, by the resource allocation node, the first WLAN resource in the AP that is allocated to the AP and used to carry the conventional WLAN service of the AP, and the second WLAN resource in the AP that is allocated to the cellular network node and used to carry the to-be-offloaded service of the cellular network node.

Manner 1

The determining, by the resource allocation node, the first WLAN resource in the AP that is allocated to the AP and used to carry the conventional WLAN service of the AP, and the second WLAN resource in the AP that is allocated to the cellular network node and used to carry the to-be-offloaded service of the cellular network node includes:

receiving, by the resource allocation node, a correspondence that is between the AP and the cellular network node and reported by the cellular network node, where the correspondence is used to indicate that the cellular network node can offload a service of the cellular network node to the AP; and determining, by the resource allocation node according to the correspondence, the first WLAN resource in the AP allocated to the AP and the second WLAN resource in the AP allocated to the cellular network node.

In this embodiment of the present invention, that there is the correspondence between the AP and the cellular network node may specifically mean that there is the correspondence between the AP and one or more cells in the cellular network node.

For example, the cellular network node may determine the correspondence between the cellular network node and the AP according to a WLAN measurement quantity reported by UE served by the cellular network node. The WLAN measurement quantity reported by the UE may be signal strength corresponding to the AP. For example, if a WLAN measurement quantity reported by UE in an LTE cell 1 shows that an AP 1, an AP 4, and an AP 5 have better signal strength, an eNB in which the LTE cell 1 is located may match the AP 1, the AP 4, and the AP 5 with the LTE cell 1, that is, determine that there is the correspondence between the AP 1, the AP 4, and the AP 5 and the LTE cell 1, and report the determined correspondence to the resource allocation node.

Certainly, when determining the first WLAN resource in the AP allocated to the AP and the second WLAN resource in the AP allocated to the cellular network node, in addition to considering the correspondence, the resource allocation node may consider another factor such as load of the AP, that is, the correspondence may be only one of factors that the resource allocation node needs to consider.

Manner 2: The determining, by the resource allocation node, the first WLAN resource in the AP that is allocated to the AP and used to carry the conventional WLAN service of the AP, and the second WLAN resource in the AP that is allocated to the cellular network node and used to carry the to-be-offloaded service of the cellular network node includes:

receiving, by the resource allocation node, signal strength of the AP that is reported by using the cellular network node by user equipment UE served by the cellular network node;

determining, by the resource allocation node, a correspondence between the AP and the cellular network node according to the signal strength of the AP, where the correspondence is used to indicate that the cellular network node can offload a service of the cellular network node to the AP; and determining, by the resource allocation node according to the correspondence, the first WLAN resource in the AP allocated to the AP and the second WLAN resource in the AP allocated to the cellular network node.

In this embodiment of the present invention, that there is the correspondence between the AP and the cellular network node may specifically mean that there is the correspondence between the AP and one or more cells in the cellular network node.

For example, after receiving a WLAN measurement quantity reported by the UE served by the cellular network node, the cellular network node may directly report the WLAN measurement quantity to the resource allocation node, and the resource allocation node determines the correspondence of the cellular network node and the AP according to the WLAN measurement quantity. For example, if a WLAN measurement quantity reported by UE in an LTE cell 1 shows that an AP 1, an AP 4, and an AP 5 have better signal strength, the resource allocation node may perform service offloading matching between the AP 1, the AP 4, and the AP 5 and the LTE cell 1, that is, determine that there is the correspondence between the AP 1, the AP 4, and the AP 5 and the LTE cell 1.

Certainly, when determining the first WLAN resource in the AP allocated to the AP and the second WLAN resource in the AP allocated to the cellular network node, in addition to considering the correspondence, the resource allocation node may consider another factor such as load of the AP, that is, the correspondence may be only one of factors that the resource allocation node needs to consider.

Manner 3

The determining, by the resource allocation node, the first WLAN resource in the AP that is allocated to the AP and used to carry the conventional WLAN service of the AP, and the second WLAN resource in the AP that is allocated to the cellular network node and used to carry the to-be-offloaded service of the cellular network node includes:

determining, by the resource allocation node, a first position in which the AP is located and a second position in which the cellular network node is located; and if determining that a distance between the first position and second position is less than a preset distance, determining, by the resource allocation node, that there is a correspondence between the AP and the cellular network node; and determining, according to the correspondence, the first WLAN resource in the AP allocated to the AP and the second WLAN resource in the AP allocated to the cellular network node.

In this case, the resource allocation node may determine positions of the AP and the cellular network node by itself, so as to determine whether there is the correspondence between the AP and the cellular network node.

For example, the resource allocation node directly obtains the position of the AP from OAM (Operation Administration and Maintenance, operation, administration and maintenance), and the position is referred to as the first position; obtains the position of the cellular network node (for example, an eNB or a NodeB) from OAM, and the position is referred to as the second position. If the distance between the first position and second position is less than the preset distance, it is considered that there is the correspondence between the AP and the cellular network node.

Manner 4

The determining, by the resource allocation node, the first WLAN resource in the AP that is allocated to the AP and used to carry the conventional WLAN service of the AP, and the second WLAN resource in the AP that is allocated to the cellular network node and used to carry the to-be-offloaded service of the cellular network node includes:

receiving, by the resource allocation node, a first resource application that is reported by the cellular network node and used to apply for a WLAN resource in the AP to transmit the to-be-offloaded service of the cellular network node, and a second resource application that is reported by the AP and used to apply for a WLAN resource in the AP to transmit the conventional WLAN service of the AP; and determining, by the resource allocation node according to the first resource application and the second resource application, the first WLAN resource in the AP allocated to the AP and the second WLAN resource in the AP allocated to the cellular network node.

It is assumed that the cellular network node maintains the correspondence between the cellular network node and the AP by itself. For example, the cellular network node is an eNB in the following.

It is assumed that there is the correspondence between a cell 1 of the eNB and each of an AP 1 and an AP 4. For example, the eNB learns in advance that specific UEs in the cell 1 are served by specific APs, and also knows QoS (for example, a target transmission rate) of each UE or an actual transmission rate of each UE in LTE. If it is assumed that five UEs in the cell 1 of the eNB fall within a coverage area of the AP 1, and a total target transmission rate of the five UEs is 10 Mbps (for example, a transmitted service is a GBR (Guaranteed Bit Rate, guaranteed bit rate) service), or a total actual transmission rate of the five UEs in LTE is 10 Mbps (for example, a transmitted service is a non-GBR (non-Guranteed Bit Rate, non-guaranteed bit rate) service); three UEs in the cell 1 of the eNB fall within a coverage area of the AP 4, and a total target transmission rate or an actual transmission rate of the three UEs is 5 Mbps. Then, the eNB applies to the resource allocation node for permission that the cell 1 of the eNB transmits a to-be-offloaded service of 10 Mbps in the AP 1, and that the cell 1 of the eNB transmits a to-be-offloaded service of 5 Mbps in the AP 4. However, the AP 1 may apply to the resource allocation node for a resource of 10 Mbps according to an actual status of the conventional WLAN service. Alternatively, the AP 1 applies, according to an actual status of the conventional WLAN service, for example, a current channel busy ratio is 40%, to the resource allocation node for 40% of WLAN resources to transmit the conventional WLAN service. The eNB learns in advance a throughput of the AP 1 in a 100% load state, and then calculates an allocation ratio according to a target transmission rate. For example, if the eNB wants to respectively transfer a to-be-offloaded service of 10 Mbps and a to-be-offloaded service of 5 Mbps of the cell 1 of the eNB to the AP 1 and the AP 4, the throughput of the AP 1 in the 100% load state is 30 Mbps, and a throughput of the AP 4 in the 100% load state is 25 Mbps, the eNB applies to the resource allocation node for permission that the to-be-offloaded service of the cell 1 of the eNB occupies 10/30=⅓ of resources in the AP 1, and applies to the resource allocation node for permission that the to-be-offloaded service of the cell 1 of the eNB occupies 5/25=0.2 of resources in the AP 4.

The first resource application and the second resource application may have different formats and content. Generally, a resource application includes information such as a standard, a cell ID (identity), and an AP ID. Each AP ID is corresponding to a to-be-offloaded resource requirement. The to-be-offloaded resource requirement may be a required resource ratio, or may be a specific resource quantity, for example, 10 Mbps.

Manner 5

The determining, by the resource allocation node, the first WLAN resource in the AP that is allocated to the AP and used to carry the conventional WLAN service of the AP, and the second WLAN resource in the AP that is allocated to the cellular network node and used to carry the to-be-offloaded service of the cellular network node includes:

receiving, by the resource allocation node, first load information that is reported by the cellular network node and that the cellular network node determines to offload to the AP, and second load information reported by the AP; and determining, by the resource allocation node according to the first load information and the second load information, the first WLAN resource in the AP allocated to the AP and the second WLAN resource in the AP allocated to the cellular network node.

If the cellular network node is an eNB, the eNB reports, to the resource allocation node, the first load information of all UEs that are in cells administered by the eNB and fall within a coverage area of the AP. The first load information may be RB (resource block) usage ratios corresponding to all the UEs in the cells of the eNB. If the cellular network node is an RNC, the RNC may report, to the resource allocation node, load information of each NodeB served by the RNC. The AP reports the second load information to the resource allocation node. The second load information may be a channel busy ratio. Certainly, the channel busy ratio may be further subdivided into a channel busy ratio occupied by the conventional WLAN service and a channel busy ratio occupied by the to-be-offloaded service of the cellular network node.

The first load information and the second load information may have different formats and content.

Step 102: The resource allocation node sends, to the AP, a first message used to indicate information about the first WLAN resource and information about the second WLAN resource; and sends, to the cellular network node, a second message used to indicate the information about the second WLAN resource.

Optionally, in this embodiment of the present invention, the first message may be in different formats. For example, a possible implementation manner of the first message is a resource allocation pattern, and the resource allocation pattern may be referred to as a first resource allocation pattern. That is, the resource allocation node may generate the first resource allocation pattern according to the information about the first WLAN resource and the information about the second WLAN resource, and the first resource allocation pattern is used to indicate the information about the first WLAN resource and the information about the second WLAN resource.

Similarly, in this embodiment of the present invention, the second message may also be in different formats. For example, a possible implementation manner of the second message is also a resource allocation pattern, and the resource allocation pattern may be referred to as a second resource allocation pattern. That is, the resource allocation node may generate the second resource allocation pattern according to the information about the second WLAN resource, and the second resource allocation pattern is used to indicate the information about the second WLAN resource.

In this embodiment of the present invention, the first resource allocation pattern may be the same as or may be different from the second resource allocation pattern. Specifically, the second resource allocation pattern may be a subset of the first resource allocation pattern.

For example, the resource allocation node may directly send the first resource allocation pattern to both the AP and the cellular network node. In this case, the first resource allocation pattern is the same as the second resource allocation pattern. As shown in FIG. 2A, FIG. 2A is a possible schematic diagram of the second resource allocation pattern. In this case, the second resource allocation pattern is the same as the first resource allocation pattern. An access point identifier in FIG. 2A is an ID of the AP, a time domain (time domain) 1 accounts for 40% of a total resource in the AP and is allocated to a to-be-offloaded service of LTE, a time domain 2 accounts for 30% of the total resource in the AP and is allocated to a to-be-offloaded service of a UMTS (Universal Mobile Telecommunications System, Universal Mobile Telecommunications System), and a time domain 3 accounts for 30% of the total resource in the AP and is allocated to the conventional WLAN service.

Alternatively, for example, the resource allocation node may modify the first resource allocation pattern, and remove the information about the first WLAN resource from the first resource allocation pattern to obtain the second resource allocation pattern; and send the second resource allocation pattern to the cellular network node. In this case, the first resource allocation pattern is different from the second resource allocation pattern. For the AP, the AP needs to transmit the conventional WLAN service and the to-be-offloaded service of the cellular network node, and therefore, the AP needs to know the information about the first WLAN resource and the information about the second WLAN resource. However, for the cellular network node, the cellular network node only needs to offload a service of the cellular network node to the AP for transmission. That is, the cellular network node needs to know only a to-be-offloaded service, and does not need to know the information about the first WLAN resource. Therefore, the resource allocation node may notify the cellular network node of only the information about the second WLAN resource. In this way, it is avoided as much as possible that the cellular network node receives redundant information, transmitted information amount is reduced, and an information transmission rate is improved. As shown in FIG. 2B, FIG. 2B is a possible schematic diagram of the second resource allocation pattern. In this case, the second resource allocation pattern is different from the first resource allocation pattern. For the first resource allocation pattern in this case, refer to FIG. 2A.

Specifically, each resource allocation pattern is divided into a WLAN resource reserved for the conventional WLAN service of the AP and a WLAN resource reserved for the to-be-offloaded service of the cellular network node. The to-be-offloaded service of the cellular network node may be a service to be offloaded from LTE, or may be a service to be offloaded from the UMTS. For a possible first resource allocation pattern, refer to FIG. 3A. For example, at each repeated interval in the first resource allocation pattern, 60% of resources are used for the to-be-offloaded service of the cellular network node, and 40% of the resources are used for the conventional WLAN service.

If the AP supports offloading of both a service of LTE and a service of the UMTS, the WLAN resource reserved for the to-be-offloaded service of the cellular network node needs to be further subdivided into a WLAN resource reserved for a to-be-offloaded service of LTE and a WLAN resource reserved for a to-be-offloaded service of the UMTS. For a possible first resource allocation pattern, refer to FIG. 3B. In FIG. 3B, 40% of resources are used for the to-be-offloaded service of LTE, 30% of the resources are used for the to-be-offloaded service of the UMTS, and 30% of the resources are used for the conventional WLAN service.

If the AP supports only the to-be-offloaded service of the cellular network node, but does not support the conventional WLAN service, the resource allocation pattern may be a WLAN resource reserved for a to-be-offloaded service of LTE and a WLAN resource reserved for a to-be-offloaded service of the UMTS. A possible first resource allocation pattern is shown in FIG. 3C. In FIG. 3C, 50% of resources are used for the to-be-offloaded service of LTE, and 50% of the resources are used for the to-be-offloaded service of the UMTS.

If the AP can work on multiple channels at the same time, the resource allocation node may configure a resource allocation pattern for each channel. The resource allocation patterns of all the channels may have same or different content. For a possible first resource allocation pattern, refer to FIG. 3D. In FIG. 3D, on a channel 1 on which the AP works, 40% of resources are used for a to-be-offloaded service of LTE, 30% of the resources are used for a to-be-offloaded service of the UMTS, and 30% of the resources are used for the conventional WLAN service. On a channel 2 on which the AP works, 30% of resources are used for the to-be-offloaded service of LTE, and 70% of the resources are used for the conventional WLAN service. In FIG. 3D, that the resource allocation patterns of all the channels have different content is used as an example.

If there is a correspondence between the AP and multiple LTE cells or UMTS cells at the same time, in this case, each resource allocation object in the first resource allocation pattern may include an ID of a specific cellular network node or a cell ID in a cellular network node. For a possible first resource allocation pattern, refer to FIG. 3E. In FIG. 3E, 40% of resources are used for a to-be-offloaded service of an LTE cell 1, 30% of the resources are used for a to-be-offloaded service of an LTE cell 2, and 30% of the resources are used for the conventional WLAN service.

Generally, a resource allocation pattern may include content such as an ID of the AP, a channel number, total duration, and a ratio of each resource segment to the total duration, and a resource allocation object.

For example, total duration of the first resource allocation pattern is 10 s, the first 4 s of a channel 1 are allocated to a to-be-offloaded service of LTE, the middle 3 s are allocated to a to-be-offloaded service of the UMTS, and the last 3s are allocated to the conventional WLAN service. Certainly, the resource allocation pattern may further include a moment at which the resource allocation pattern functions. The moment may be a specific moment or may be a relative moment. For example, the resource allocation pattern functions after 1 s later than receiving of the information.

In addition, after allocation, the resource allocation pattern may occur periodically, or may occur for one time. For example, after receiving the first resource allocation pattern, the AP repeatedly uses the first resource allocation pattern until the AP receives a new resource allocation pattern; or after receiving the first resource allocation pattern, the AP uses the first resource allocation pattern for one time.

When the resource allocation node is an SRC, a basic architectural diagram is shown in FIG. 4A. Certainly, a function of the SRC may be located on a single network node, or may be specifically implemented on an RNC or an eNB. For example, if the function of the SRC is implemented on the RNC, the RNC on which the function of the SRC is implemented may manage multiple NodeBs at the same time.

Then, the cellular network node reports the correspondence between the cellular network node and the AP to the resource allocation node. If the cellular network node is an RNC, the RNC reports the correspondence between the RNC and the AP to the SRC. For example, the RNC notifies the SRC that there is a correspondence between a specific cell of a specific NodeB and a specific AP. If the cellular network node is an eNB, the eNB reports the correspondence between the eNB and the AP to the SRC. For example, the eNB notifies the SRC that there is a correspondence between a specific LTE cell and a specific AP.

Figure 4B:
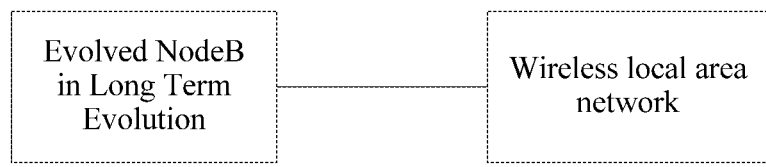
FIG. 4B is a basic architectural diagram when a resource allocation node is an eNB according to an embodiment of the present invention.
Figure 4C:
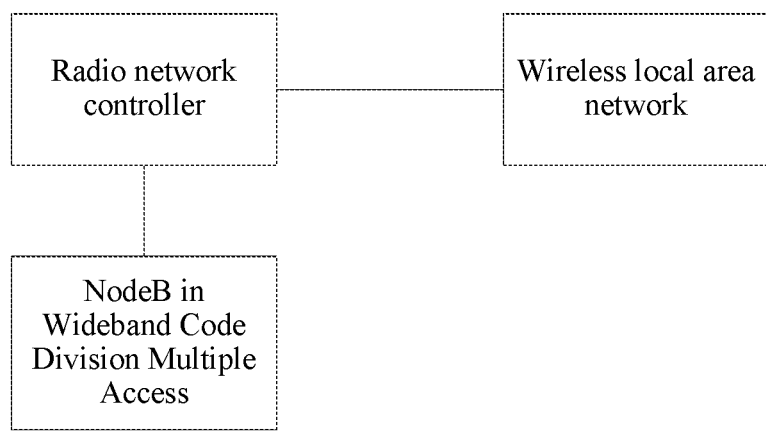
FIG. 4C is a basic architectural diagram when a resource allocation node is an RNC according to an embodiment of the present invention.
Figure 4D:
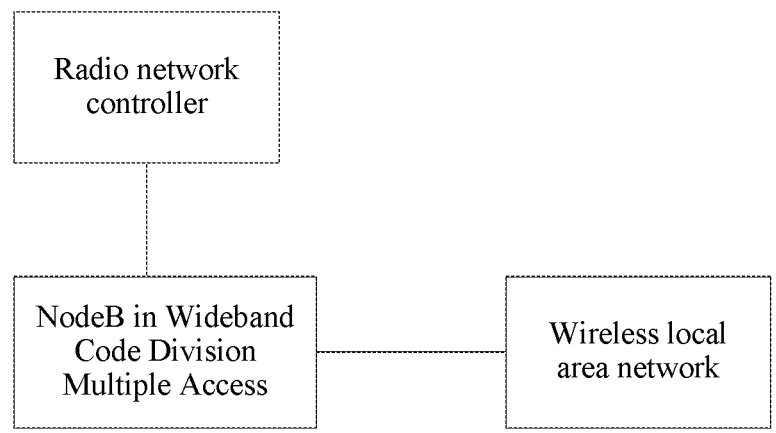
FIG. 4D is a basic architectural diagram when a resource allocation node is a NodeB according to an embodiment of the present invention.

When the resource allocation node is an eNB, a basic architectural diagram is shown in FIG. 4B. When the resource allocation node is an RNC, a basic architectural diagram is shown in FIG. 4C. When the resource allocation node is a NodeB, a basic architectural diagram is shown in FIG. 4D.

It can be seen from FIG. 4B that when the resource allocation node is the eNB, the eNB may manage multiple WLANs at the same time.

In this case, the eNB knows the correspondence between the eNB and the AP. The eNB sends the first resource allocation pattern to the AP. Because the eNB is the resource allocation node, the eNB knows the second resource allocation pattern.

It can be seen from FIG. 4C that when the resource allocation node is the RNC, the RNC may manage multiple NodeBs and WLANs at the same time.

In this case, the NodeBs send the correspondence between the NodeBs and the AP to the RNC. The RNC sends the first resource allocation pattern to the AP, and sends the second resource allocation pattern to a corresponding NodeB.

It can be seen from FIG. 4D that when the resource allocation node is the NodeB, the NodeB may manage multiple WLANs at the same time.

In this case, the NodeB knows the correspondence between the NodeB and the AP. The NodeB sends the first resource allocation pattern to the AP. Because the NodeB is the resource allocation node, the NodeB knows the second resource allocation pattern.

The WLAN in FIG. 4A to FIG. 4D may refer to the AP.

Figure 4E:
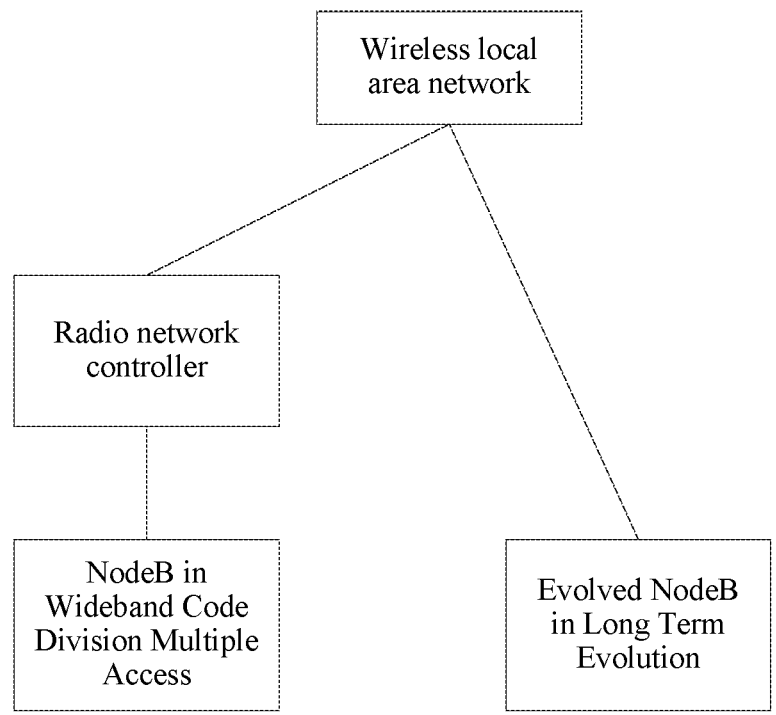
FIG. 4E is a basic architectural diagram when a resource allocation node is an AC according to an embodiment of the present invention.

When the resource allocation node is an AC, a basic architectural diagram is shown in FIG. 4E. In this case, the AC may manage multiple APs at the same time, and there may be a correspondence between each AP and different cellular network nodes. The cellular network nodes notify the AC of the correspondence. The AC sends the first resource allocation pattern to a corresponding AP managed by the AC, and sends the second resource allocation pattern to the cellular network nodes. The WLAN in FIG. 4E may refer to the AC.

If the cellular network node reports the first resource application to the resource allocation node, and the AP reports the second resource application to the resource allocation node, when allocating the first resource allocation pattern to the AP, the resource allocation node may consider the first resource application and the second resource application.

For example, if the cellular network node is an eNB, the eNB applies for 40% of resources in the AP for a to-be-offloaded service of LTE, and the AP applies for 70% of the resources, the resource allocation node may finally allocate 70% of the resources to the conventional WLAN service and allocate 30% of the resources to the to-be-offloaded service of LTE; or may perform allocation at another ratio.

For another example, if the eNB applies for permission to offload a service of 10 Mbps to the AP, the resource allocation node may need to analyze whether the AP can support the service of 10 Mbps, an approximate required resource, and the like according to a historical status of the AP. For example, if a current channel busy ratio of the AP is 50%, a current throughput of the AP is 10 Mbps, a historical channel busy ratio of the AP is 100%, and a historical throughput of the AP is 20 Mbps, it indicates that the AP may further accommodate a to-be-offloaded service of 10 Mbps, so that the resource allocation node may allocate 50% of WLAN resources to the to-be-offloaded service of the cellular network node.

If the cellular network node reports the first load information to the resource allocation node, and the AP reports the second load information to the resource allocation node, when allocating the first resource allocation pattern to the AP, the resource allocation node may consider the second load information, and preferably, may consider both the first load information and the second load information.

If there is the correspondence between an LTE cell 1 and an AP 1, according to the second load information of the AP 1, for example, a channel busy ratio of the AP 1 is 50%, 40% of which is a channel busy ratio of the conventional WLAN service, and 10% of which is a channel busy ratio of the to-be-offloaded service of the cellular network node, the resource allocation node may allocate 60% of WLAN resources to a to-be-offloaded service of the LTE cell 1 and allocate rest 40% of the WLAN resources to the conventional WLAN service. Alternatively, with further reference to the first load information of the LTE cell 1, for example, load of the LTE cell 1 is 50%, the resource allocation node may consider that there is no need to offload a service of the LTE cell 1 to the AP 1, and allocate 100% of the WLAN resources in the AP 1 to the conventional WLAN service.

Further, in an embodiment of the present invention, after the sending, by the resource allocation node to the AP, the first message used to indicate the information about the first WLAN resource and the information about the second WLAN resource, the method further includes: receiving, by the resource allocation node, usage information of the first WLAN resource and the second WLAN resource that is reported by the AP. Specifically, if the first message is actually the first resource allocation pattern, the resource allocation node may receive the usage information of the first resource allocation pattern that is reported by the AP.

Figures 5, 6:
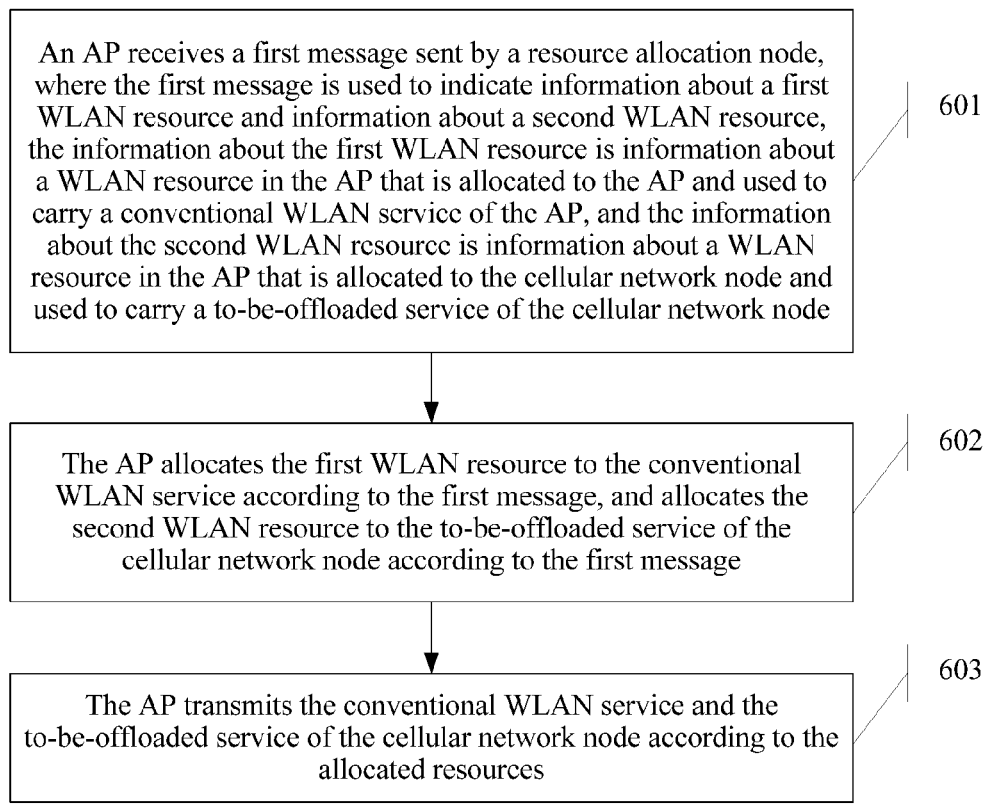
FIG. 5 is a schematic diagram of a first resource allocation pattern according to an embodiment of the present invention.
FIG. 6 is a main flowchart of a service transmission method on an AP side according to an embodiment of the present invention.

For example, for a resource allocation pattern shown in FIG. 5, actual resource usage fed back by the AP is: utilization of a time domain 1 is 80% (80% of 40%, that is, 32%), utilization of a time domain 2 is 50% (50% of 30%, that is, 15%), and utilization of a time domain 3 is 100% (100% of 30%, that is, 30%).

Referring to FIG. 6, based on a same invention concept, an embodiment of the present invention provides a service transmission method. A main procedure of the method is described as follows.

Step 601: An AP receives a first message sent by a resource allocation node, where the first message is used to indicate information about a first WLAN resource and information about a second WLAN resource, the information about the first WLAN resource is information about a WLAN resource in the AP that is allocated to the AP and used to carry a conventional WLAN service of the AP, and the information about the second WLAN resource is information about a WLAN resource in the AP that is allocated to the cellular network node and used to carry a to-be-offloaded service of the cellular network node.

Specifically, the first message may be, for example, a first resource allocation pattern. The first resource allocation pattern is described in detail in the procedure in FIG. 1, and is not repeatedly described herein.

After generating the first resource allocation pattern, the resource allocation node may send the first resource allocation pattern to the AP.

Step 602: The AP allocates the first WLAN resource to the conventional WLAN service according to the first message, and allocates the second WLAN resource to the to-be-offloaded service of the cellular network node according to the first message.

If the first message is specifically the first resource allocation pattern, after receiving the first resource allocation pattern, the AP may determine the information about the first WLAN resource and the information about the second WLAN resource that are included in the first resource allocation pattern, so as to determine to allocate the first WLAN resource in the AP to the conventional WLAN service, and allocate the second WLAN resource in the AP to the to-be-offloaded service of the cellular network node.

Optionally, in this embodiment of the present invention, after the AP receives the first resource allocation pattern, there are many methods for transmitting a corresponding service by using a corresponding resource.

For example, a point coordination function (Point Coordination Function, PCF) mechanism is used. That is, a time period that is in the first resource allocation pattern and allocated to the to-be-offloaded service of the cellular network node is set as a contention free period (Contention Free Period, CFP), and an access manner similar to PCF is used; however, a time period allocated to the conventional WLAN service is set as a contention period (Contention Period, CF), and a distributed coordination function (Distributed Coordination Function, DCF) access manner is used. A specific implementation method is: in the CFP period, only UE corresponding to the to-be-offloaded service of the cellular network node is scheduled; in the CP period, UE corresponding to the conventional WLAN service contends for an access channel.

Step 603: The AP transmits the conventional WLAN service and the to-be-offloaded service of the cellular network node according to the allocated resources.

Referring to FIG. 7, based on a same invention concept, an embodiment of the present invention provides another service transmission method. A main procedure of the method is described as follows:

Step 701: When it is determined to offload a service of the cellular network node to an AP, the cellular network node receives a second message used to indicate information about a second WLAN resource, where the information about the second WLAN resource is information about a WLAN resource in the AP that is allocated to the cellular network node and used to carry a to-be-offloaded service of the cellular network node.

Specifically, the second message may be a second resource allocation pattern. The second resource allocation pattern is described in detail in the procedure in FIG. 1, and is not repeatedly described herein.

After generating the second resource allocation pattern, the resource allocation node may send the second resource allocation pattern to the cellular network node.

First, the cellular network node needs to determine specific UE that is served by the cellular network node and needs to offload a service. For example, the cellular network node may determine that a service 1 of UE 1 in a cell 1 of the cellular network node needs to be offloaded, and that a service 2 of UE 2 in a cell 2 of the cellular network node needs to be offloaded.

After determining specific UE that needs to offload a service, the cellular network node receives the second resource allocation pattern. Certainly, the resource allocation pattern may be actively sent by the resource allocation node to the cellular network node, or may be obtained by the cellular network node after the cellular network node reports first load information or first resource application to the resource allocation node. Specific manners are described in the procedure in FIG. 1, and are not repeatedly described.

Step 702: The cellular network node sends the second message to user equipment UE, where the second message is used by the UE to transmit the service according to the second message, and the UE is UE corresponding to the to-be-offloaded service of the cellular network node.

If the cellular network node determines, according to the second resource allocation pattern, the WLAN resource allocated to the cellular network node, and the cellular network node determines a service of which UE that is to be offloaded to the AP, the cellular network node may send the second resource allocation pattern to the UE corresponding to the to-be-offloaded service. In this way, after receiving the second resource allocation pattern, the corresponding UE may transmit the service according to the second resource allocation pattern.

Optionally, in this embodiment of the present invention, after the receiving, by the cellular network node, a second message used to indicate information about a second WLAN resource, the method further includes: sending, by the cellular network node, an identity of the UE and convergence layer information of the UE to the AP, where the convergence layer information is used by the AP to send a data packet corresponding to the to-be-offloaded service of the cellular network node to a corresponding offloading layer of the cellular network node according to the convergence layer information after the data packet is processed, and the offloading layer is an offloading layer indicated by the convergence layer information.

When the cellular network node offloads some services to the AP, the cellular network node needs to notify the AP of identities of UEs corresponding to the to-be-offloaded services and corresponding convergence layer information (for example, the IP (Internet Protocol, Internet Protocol)/the PDCP (Packet Data Convergence Protocol, Packet Data Convergence Protocol)/RLC (Radio Link Control, Radio Link Control) offloading and convergence). For example, referring to FIG. 2A again. If the AP receives a UL (uplink) data packet in the time domain 1, the data packet is regarded as a data packet offloaded from an eNB, and the data packet needs to be sent to a corresponding offloading layer of the eNB after the data packet is properly processed. The offloading layer is an offloading layer indicated by the convergence layer information. For example, if the convergence layer information is the IP, the offloading layer is an IP offloading layer.

In addition, the cellular network node notifies the UE corresponding to the to-be-offloaded service of the second resource allocation pattern and the convergence layer information (or notifies the UE of one of the second resource allocation pattern or a convergence layer information stipulated in a protocol). When the UE receives a DL (downlink) data packet in the time domain 1, the data packet is regarded as an LTE data packet offloaded to the AP, and the data packet needs to be sent to a corresponding offloading layer of an LTE module of the UE after the data packet is properly processed. The offloading layer is an offloading layer indicated by the convergence layer information.

Referring to FIG. 8, based on a same invention concept, an embodiment of the present invention provides a resource allocation node. The resource allocation node may include a determining module 801 and a sending module 802.

The determining module 801 is configured to: when it is determined to offload a service of the cellular network node to an AP, determine a first WLAN resource in the AP that is allocated to the AP and used to carry a conventional WLAN service of the AP, and a second WLAN resource in the AP that is allocated to the cellular network node and used to carry a to-be-offloaded service of the cellular network node.

The sending module 802 is configured to: send, to the AP, a first message used to indicate information about the first WLAN resource and information about the second WLAN resource; and send, to the cellular network node, a second message used to indicate the information about the second WLAN resource.

Optionally, in this embodiment of the present invention, the determining module 801 is specifically configured to:

receive a correspondence that is between the AP and the cellular network node and reported by the cellular network node, where the correspondence is used to indicate that the cellular network node can offload a service of the cellular network node to the AP; and determine, according to the correspondence, the first WLAN resource in the AP allocated to the AP and the second WLAN resource in the AP allocated to the cellular network node.

Optionally, in this embodiment of the present invention, the determining module 801 is specifically configured to:

receive signal strength of the AP that is reported by using the cellular network node by UE served by the cellular network node;

determine a correspondence between the AP and the cellular network node according to the signal strength of the AP, where the correspondence is used to indicate that the cellular network node can offload a service of the cellular network node to the AP; and determine, according to the correspondence, the first WLAN resource in the AP allocated to the AP and the second WLAN resource in the AP allocated to the cellular network node.

Optionally, in this embodiment of the present invention, the determining module 801 is specifically configured to:

determine a first position in which the AP is located and a second position in which the cellular network node is located; and if determining that a distance between the first position and second position is less than a preset distance, determine that there is a correspondence between the AP and the cellular network node; and determine, according to the correspondence, the first WLAN resource in the AP allocated to the AP and the second WLAN resource in the AP allocated to the cellular network node.

Optionally, in this embodiment of the present invention, the determining module 801 is specifically configured to:

receive a first resource application that is reported by the cellular network node and used to apply for a WLAN resource in the AP to transmit the to-be-offloaded service of the cellular network node, and a second resource application that is reported by the AP and used to apply for a WLAN resource in the AP to transmit the conventional WLAN service of the AP; and determine, according to the first resource application and the second resource application, the first WLAN resource in the AP allocated to the AP and the second WLAN resource in the AP allocated to the cellular network node.

Optionally, in this embodiment of the present invention, the determining module 801 is specifically configured to:

receive first load information that is reported by the cellular network node and that the cellular network node determines to offload to the AP, and second load information reported by the AP; and determine, according to the first load information and the second load information, the first WLAN resource in the AP allocated to the AP and the second WLAN resource in the AP allocated to the cellular network node.

Optionally, in this embodiment of the present invention, the resource allocation node may further include a receiving module, configured to: after the sending module 802 sends, to the AP, the first message used to indicate the information about the first WLAN resource and the information about the second WLAN resource, receive usage information of the first WLAN resource and the second WLAN resource that is reported by the AP.

Figure 9:
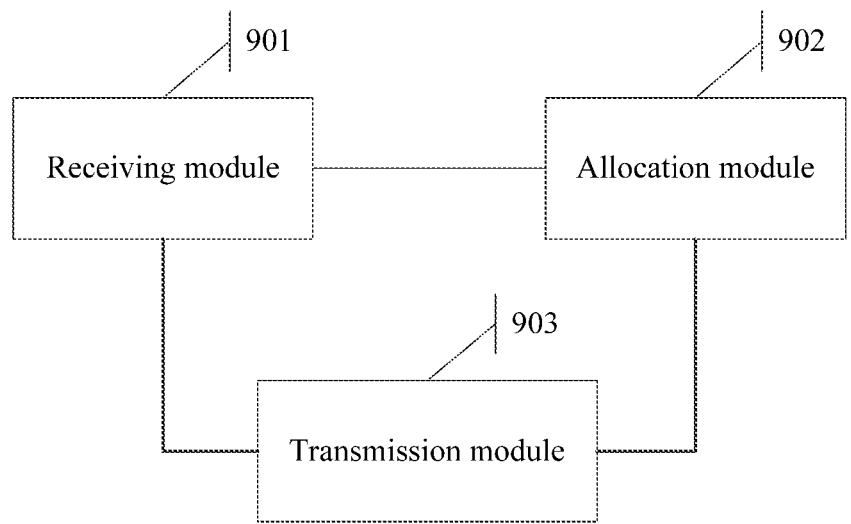
FIG. 9 is a main structural block diagram of an AP according to an embodiment of the present invention.

Referring to FIG. 9, based on a same invention concept, an embodiment of the present invention provides an AP. The AP may include a receiving module 901, an allocation module 902, and a transmission module 903.

The receiving module 901 is configured to receive a first message sent by a resource allocation node, where the first message is used to indicate information about a first WLAN resource and information about a second WLAN resource, the information about the first WLAN resource is information about a WLAN resource in the AP that is allocated to the AP and used to carry a conventional WLAN service of the AP, and the information about the second WLAN resource is information about a WLAN resource in the AP that is allocated to the cellular network node and used to carry a to-be-offloaded service of the cellular network node.

The allocation module 902 is configured to: allocate the first WLAN resource to the conventional WLAN service according to the first message, and allocate the second WLAN resource to the to-be-offloaded service of the cellular network node according to the first message.

The transmission module 903 is configured to transmit the conventional WLAN service and the to-be-offloaded service of the cellular network node according to the allocated resources.

Figure 10:
FIG. 10 is a main structural block diagram of a cellular network node according to an embodiment of the present invention.

Referring to FIG. 10, based on a same invention concept, an embodiment of the present invention provides a cellular network node. The cellular network node may include a receiving module 1001 and a sending module 1002.

The receiving module 1001 is configured to: when it is determined to offload a service of the cellular network node to an AP, receive a second message used to indicate information about a second WLAN resource, where the information about the second WLAN resource is information about a WLAN resource in the AP that is allocated to the cellular network node and used to carry a to-be-offloaded service of the cellular network node.

The sending module 1002 is configured to send the second message to user equipment UE, where the second message is used by the UE to transmit the service according to the second message, and the UE is UE corresponding to the to-be-offloaded service of the cellular network node.

Optionally, in this embodiment of the present invention, the sending module 1002 is further configured to send an identity of the UE and convergence layer information of the UE to the AP after the receiving module 1001 receives the second message used to indicate the information about the second WLAN resource, where the convergence layer information is used by the AP to send a data packet corresponding to the to-be-offloaded service of the cellular network node to a corresponding offloading layer of the cellular network node according to the convergence layer information after the data packet is processed, and the offloading layer is an offloading layer indicated by the convergence layer information.

Figure 11:
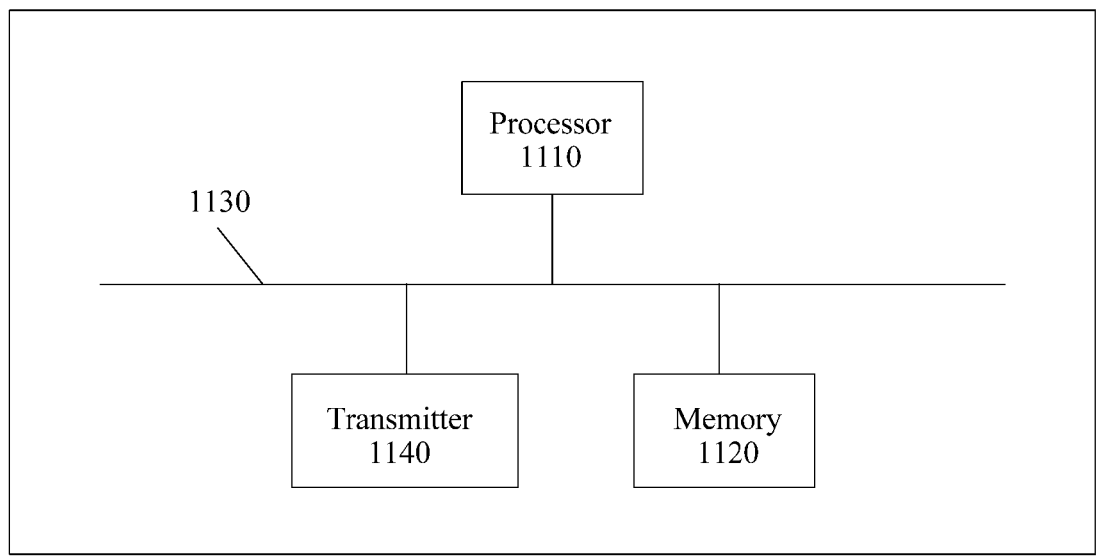
FIG. 11 is a main schematic structural diagram of a resource allocation node according to an embodiment of the present invention.

Referring to FIG. 11, based on a same invention concept, an embodiment of the present invention provides a resource allocation node. The resource allocation node includes a bus 1130 and a processor 1110, a memory 1120, and a transmitter 1140 that are connected to the bus 1130. The memory 1120 is configured to store an instruction required by the processor 1110 to execute a task. The processor 1110 is configured to execute the instruction stored in the memory 1120 to: when it is determined to offload a service of the cellular network node to an access point AP, determine a first WLAN resource in the AP that is allocated to the AP and used to carry a conventional WLAN service of the AP, and a second WLAN resource in the AP that is allocated to the cellular network node and used to carry a to-be-offloaded service of the cellular network node. The transmitter 1140 is configured to: send, to the AP, a first message used to indicate information about the first WLAN resource and information about the second WLAN resource; and send, to the cellular network node, a second message used to indicate the information about the second WLAN resource.

Optionally, in this embodiment of the present invention, the resource allocation node may further include a receiver connected to the bus 1130. The processor 1110 is specifically configured to execute the instruction to: receive, by using the receiver, a correspondence that is between the AP and the cellular network node and reported by the cellular network node, where the correspondence is used to indicate that the cellular network node can offload a service of the cellular network node to the AP; and determine, according to the correspondence, the first WLAN resource in the AP allocated to the AP and the second WLAN resource in the AP allocated to the cellular network node.

Optionally, in this embodiment of the present invention, the resource allocation node may further include the receiver connected to the bus 1130. The processor 1110 is specifically configured to execute the instruction to: receive, by using the receiver, signal strength of the AP that is reported by using the cellular network node by user equipment UE served by the cellular network node; determine a correspondence between the AP and the cellular network node according to the signal strength of the AP, where the correspondence is used to indicate that the cellular network node can offload a service of the cellular network node to the AP; and determine, according to the correspondence, the first WLAN resource in the AP allocated to the AP and the second WLAN resource in the AP allocated to the cellular network node.

Optionally, in this embodiment of the present invention, the processor 1110 is specifically configured to execute the instruction to: determine a first position in which the AP is located and a second position in which the cellular network node is located; and if determining that a distance between the first position and second position is less than a preset distance, determine that there is a correspondence between the AP and the cellular network node, and determine, according to the correspondence, the first WLAN resource in the AP allocated to the AP and the second WLAN resource in the AP allocated to the cellular network node.

Optionally, in this embodiment of the present invention, the resource allocation node may further include the receiver connected to the bus 1130. The processor 1110 is specifically configured to execute the instruction to: receive, by using the receiver, a first resource application that is reported by the cellular network node and used to apply for a WLAN resource in the AP to transmit the to-be-offloaded service of the cellular network node, and a second resource application that is reported by the AP and used to apply for a WLAN resource in the AP to transmit the conventional WLAN service of the AP; and determine, according to the first resource application and the second resource application, the first WLAN resource in the AP allocated to the AP and the second WLAN resource in the AP allocated to the cellular network node.

Optionally, in this embodiment of the present invention, the resource allocation node may further include the receiver connected to the bus 1130. The processor 1110 is specifically configured to execute the instruction to: receive, by using the receiver, first load information that is reported by the cellular network node and that the cellular network node determines to offload to the AP, and second load information reported by the AP; and determine, according to the first load information and the second load information, the first WLAN resource in the AP allocated to the AP and the second WLAN resource in the AP allocated to the cellular network node.

Optionally, in this embodiment of the present invention, the resource allocation node may further include the receiver, connected to the bus 1130 and configured to: after the transmitter 1140 sends, to the AP, the first message used to indicate the information about the first WLAN resource and the information about the second WLAN resource, receive usage information of the first WLAN resource and the second WLAN resource that is reported by the AP.

Figure 12:
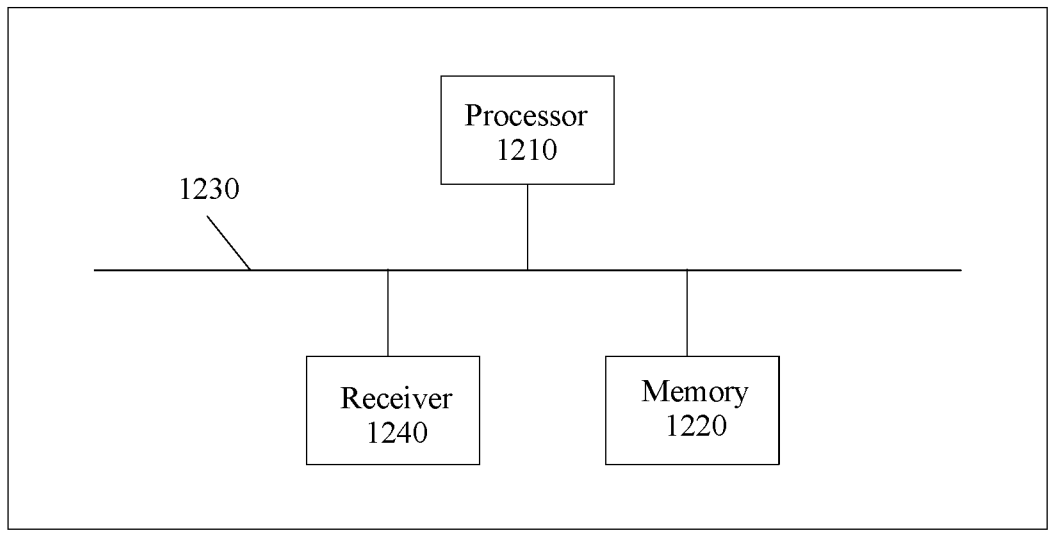
FIG. 12 is a main schematic structural diagram of an AP according to an embodiment of the present invention.

Referring to FIG. 12, based on a same invention concept, an embodiment of the present invention provides an AP. The AP includes a bus 1230 and a processor 1210, a memory 1220, and a receiver 1240 that are connected to the bus 1230. The memory 1220 is configured to store an instruction required by the processor 1210 to execute a task. The receiver 1240 is configured to receive a first message sent by a resource allocation node, where the first message is used to indicate information about a first WLAN resource and information about a second WLAN resource, the information about the first WLAN resource is information about a WLAN resource in the AP that is allocated to the AP and used to carry a conventional WLAN service of the AP, and the information about the second WLAN resource is information about a WLAN resource in the AP that is allocated to the cellular network node and used to carry a to-be-offloaded service of the cellular network node. The processor 1210 is configured to execute the instruction to: allocate the first WLAN resource to the conventional WLAN service according to the first message, and allocate the second WLAN resource to the to-be-offloaded service of the cellular network node according to the first message; and transmit the conventional WLAN service and the to-be-offloaded service of the cellular network node according to the allocated resources.

Figure 13:
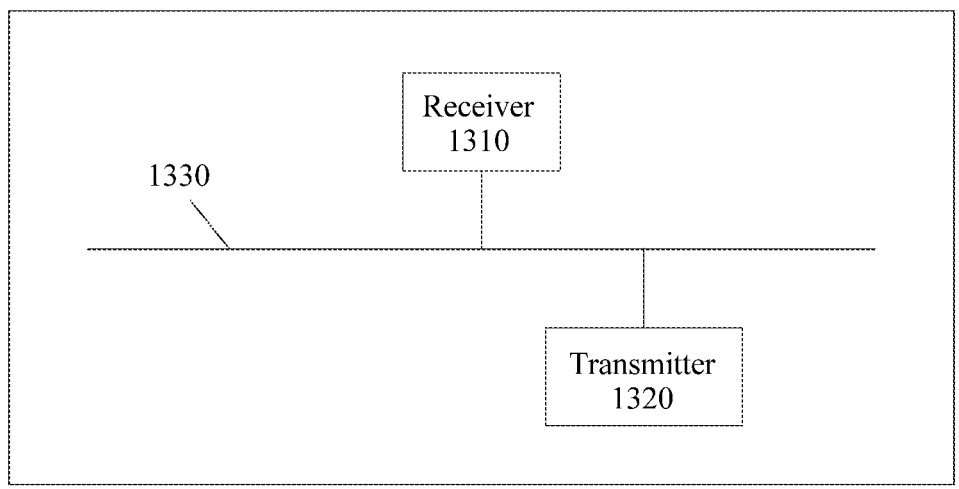
FIG. 13 is a main schematic structural diagram of a cellular network node according to an embodiment of the present invention.

Referring to FIG. 13, based on a same invention concept, an embodiment of the present invention provides a cellular network node. The cellular network node includes a bus 1330 and a receiver 1310 and a transmitter 1320 that are connected to the bus 1330. The receiver 1310 is configured to: when it is determined to offload a service of the cellular network node to an AP, receive a second message used to indicate information about a second WLAN resource, where the information about the second WLAN resource is information about a WLAN resource in the AP that is allocated to the cellular network node and used to carry a to-be-offloaded service of the cellular network node. The transmitter 1320 is configured to send the second message to UE, where the second message is used by the UE to transmit the service according to the second message, and the UE is UE corresponding to the to-be-offloaded service of the cellular network node.

Optionally, in this embodiment of the present invention, the transmitter 1320 is further configured to send an identity of the UE and convergence layer information of the UE to the AP after the receiver1310 receives the second message used to indicate the information about the second WLAN resource, where the convergence layer information is used by the AP to send a data packet corresponding to the to-be-offloaded service of the cellular network node to a corresponding offloading layer of the cellular network node according to the convergence layer information after the data packet is processed, and the offloading layer is an offloading layer indicated by the convergence layer information.

A resource allocation method in embodiments of the present invention includes: when it is determined to offload a service of the cellular network node to an access point AP, determining, by a resource allocation node, a first WLAN resource in the AP that is allocated to the AP and used to carry a conventional wireless local area network WLAN service of the AP, and a second WLAN resource in the AP that is allocated to the cellular network node and used to carry a to-be-offloaded service of the cellular network node; and sending, by the resource allocation node to the AP, a first message used to indicate information about the first WLAN resource and information about the second WLAN resource, and sending, to the cellular network node, a second message used to indicate the information about the second WLAN resource.

In the embodiments of the present invention, it is required to determine the first WLAN resource in the AP allocated to the AP and the second WLAN resource in the AP allocated to the cellular network node, that is, specify WLAN resources separately allocated in the AP to the conventional WLAN service of the AP and the to-be-offloaded service of the cellular network node, and to separately notify the AP and the cellular network node of an allocation result. In this way, both the conventional WLAN service and the to-be-offloaded service of the cellular network node are transmitted on only the respective allocated WLAN resources, so as to avoid that the WLAN service and the to-be-offloaded service of the cellular network node contend for a channel. Therefore, not only all data can be transmitted, but also data transmission smoothness can be ensured as much as possible, so as to avoid channel blocking, improve data transmission efficiency, and improve user experience of the to-be-offloaded service of the cellular network node and the WLAN service.

It may be clearly understood by a person skilled in the art that, for the purpose of convenient and brief description, division of the foregoing function modules is merely used as an example for illustration. In actual application, the foregoing functions can be allocated to different function modules for implementing according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, or a network device) or a processor (processor) to perform all or some of the steps of the methods described in the embodiments of this application.

The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely used to describe the technical solutions of this application in detail. The foregoing embodiments are merely intended to help understand the method and core idea of the present invention, and shall not be construed as a limitation on the present invention. Any variation or replacement readily figured out by a person skilled in the art within the technical scope disclosed in the present invention shall fall within the protection scope of the present invention.

What is claimed is:

1. A resource allocation method, comprising:
when it is determined to offload a service of a cellular network node to an access point (AP), determining, by a resource allocation node, a first wireless local area network (WLAN) resource in the AP that is allocated to the AP and used to carry a conventional WLAN service of the AP, and a second WLAN resource in the AP that is allocated to the cellular network node and used to carry a to-be-offloaded service of the cellular network node; and
sending, by the resource allocation node to the AP, a first message used to indicate information about the first WLAN resource and information about the second WLAN resource; and sending, to the cellular network node, a second message used to indicate the information about the second WLAN resource.

2. The method according to claim 1, wherein the determining, by a resource allocation node, a first WLAN resource in the AP that is allocated to the AP and used to carry a conventional WLAN service of the AP, and a second WLAN resource in the AP that is allocated to the cellular network node and used to carry a to-be-offloaded service of the cellular network node comprises:
receiving, by the resource allocation node, a correspondence that is between the AP and the cellular network node and reported by the cellular network node, wherein the correspondence is used to indicate that the cellular network node can offload a service of the cellular network node to the AP; and
determining, by the resource allocation node according to the correspondence, the first WLAN resource in the AP allocated to the AP and the second WLAN resource in the AP allocated to the cellular network node.

3. The method according to claim 1, wherein the determining, by a resource allocation node, a first WLAN resource in the AP that is allocated to the AP and used to carry a conventional WLAN service of the AP, and a second WLAN resource in the AP that is allocated to the cellular network node and used to carry a to-be-offloaded service of the cellular network node comprises:
receiving, by the resource allocation node, signal strength of the AP that is reported by using the cellular network node by user equipment (UE) served by the cellular network node;
determining, by the resource allocation node, a correspondence between the AP and the cellular network node according to the signal strength of the AP, wherein the correspondence is used to indicate that the cellular network node can offload a service of the cellular network node to the AP; and
determining, by the resource allocation node according to the correspondence, the first WLAN resource in the AP allocated to the AP and the second WLAN resource in the AP allocated to the cellular network node.

4. The method according to claim 1, wherein the determining, by a resource allocation node, a first WLAN resource in the AP that is allocated to the AP and used to carry a conventional WLAN service of the AP, and a second WLAN resource in the AP that is allocated to the cellular network node and used to carry a to-be-offloaded service of the cellular network node comprises:
   determining, by the resource allocation node, a first position in which the AP is located and a second position in which the cellular network node is located; and
   if determining that a distance between the first position and second position is less than a preset distance, determining, by the resource allocation node, that there is a correspondence between the AP and the cellular network node; and determining, according to the correspondence, the first WLAN resource in the AP allocated to the AP and the second WLAN resource in the AP allocated to the cellular network node.

5. The method according to claim 1, wherein the determining, by a resource allocation node, a first WLAN resource in the AP that is allocated to the AP and used to carry a conventional WLAN service of the AP, and a second WLAN resource in the AP that is allocated to the cellular network node and used to carry a to-be-offloaded service of the cellular network node comprises:
   receiving, by the resource allocation node, a first resource application that is reported by the cellular network node and used to apply for a WLAN resource in the AP to transmit the to-be-offloaded service of the cellular network node, and a second resource application that is reported by the AP and used to apply for a WLAN resource in the AP to transmit the conventional WLAN service of the AP; and
   determining, by the resource allocation node according to the first resource application and the second resource application, the first WLAN resource in the AP allocated to the AP and the second WLAN resource in the AP allocated to the cellular network node.

6. The method according to claim 1, wherein the determining, by a resource allocation node, a first WLAN resource in the AP that is allocated to the AP and used to carry a conventional WLAN service of the AP, and a second WLAN resource in the AP that is allocated to the cellular network node and used to carry a to-be-offloaded service of the cellular network node comprises:
   receiving, by the resource allocation node, first load information that is reported by the cellular network node and corresponding to the service that the cellular network node determines to offload to the AP, and second load information reported by the AP; and
   determining, by the resource allocation node according to the first load information and the second load information, the first WLAN resource in the AP allocated to the AP and the second WLAN resource in the AP allocated to the cellular network node.

7. The method according to claim 1, wherein after the sending, by the resource allocation node to the AP, a first message used to indicate information about the first WLAN resource and information about the second WLAN resource, the method further comprises:
   receiving, by the resource allocation node, usage information of the first WLAN resource and the second WLAN resource that is reported by the AP.

8. A service transmission method, comprising:
   receiving, by an access point (AP), a first message sent by a resource allocation node, wherein the first message is used to indicate information about a first wireless local area network (WLAN) resource and information about a second WLAN resource, the information about the first WLAN resource is information about a WLAN resource in the AP that is allocated to the AP and used to carry a conventional WLAN service of the AP, and the information about the second WLAN resource is information about a WLAN resource in the AP that is allocated to the cellular network node and used to carry a to-be-offloaded service of the cellular network node;
   allocating, by the AP, the first WLAN resource to the conventional WLAN service according to the first message, and allocating the second WLAN resource to the to-be-offloaded service of the cellular network node according to the first message; and
   transmitting, by the AP, the conventional WLAN service and the to-be-offloaded service of the cellular network node according to the allocated resources.

9. A service transmission method, comprising:
   when it is determined to offload a service of a cellular network node to an access point (AP), receiving, by the cellular network node, a second message used to indicate information about a second wireless local area network (WLAN) resource, wherein the information about the second WLAN resource is information about a WLAN resource in the AP that is allocated to the cellular network node and used to carry a to-be-offloaded service of the cellular network node; and
   sending, by the cellular network node, the second message to user equipment (UE), wherein the second message is used by the UE to transmit the service according to the second message, and the UE is a UE corresponding to the to-be-offloaded service of the cellular network node.

10. The method according to claim 9, wherein after the receiving, by the cellular network node, a second message used to indicate information about a second WLAN resource, the method further comprises: sending, by the cellular network node, an identity of the UE and convergence layer information of the UE to the AP, wherein the convergence layer information is used by the AP to send a data packet corresponding to the to-be-offloaded service of the cellular network node to a corresponding offloading layer of the cellular network node according to the convergence layer information after the data packet is processed, and the offloading layer is an offloading layer indicated by the convergence layer information.

11. A resource allocation node, comprising:
   a memory; and
   a processor coupled to the memory and configured to:
   when it is determined to offload a service of a cellular network node to an access point (AP), determine a first wireless local area network (WLAN) resource in the AP that is allocated to the AP and used to carry a conventional WLAN service of the AP, and a second WLAN resource in the AP that is allocated to the cellular network node and used to carry a to-be-offloaded service of the cellular network node; and
   send, to the AP, a first message used to indicate information about the first WLAN resource and information about the second WLAN resource; and send, to the cellular network node, a second message used to indicate the information about the second WLAN resource.

12. The resource allocation node according to claim 11, wherein the resource allocation node further comprises a receiver, and the processor is further configured to:
receive, by using the receiver, a correspondence that is between the AP and the cellular network node and reported by the cellular network node, wherein the correspondence is used to indicate that the cellular network node can offload a service of the cellular network node to the AP; and
determine, according to the correspondence, the first WLAN resource in the AP allocated to the AP and the second WLAN resource in the AP allocated to the cellular network node.

13. The resource allocation node according to claim 11, wherein the resource allocation node further comprises a receiver, and the processor is further configured to:
receive, by using the receiver, signal strength of the AP that is reported by using the cellular network node by user equipment UE served by the cellular network node;
determine a correspondence between the AP and the cellular network node according to the signal strength of the AP, wherein the correspondence is used to indicate that the cellular network node can offload a service of the cellular network node to the AP; and
determine, according to the correspondence, the first WLAN resource in the AP allocated to the AP and the second WLAN resource in the AP allocated to the cellular network node.

14. The resource allocation node according to claim 11, wherein the processor is further configured to:
determine a first position in which the AP is located and a second position in which the cellular network node is located; and
if a distance between the first position and second position is less than a preset distance, determine that there is a correspondence between the AP and the cellular network node; and determine, according to the correspondence, the first WLAN resource in the AP allocated to the AP and the second WLAN resource in the AP allocated to the cellular network node.

15. The resource allocation node according to claim 11, wherein the resource allocation node further comprises a receiver, and the processor is further configured to:
receive, by using the receiver, a first resource application that is reported by the cellular network node and used to apply for a WLAN resource in the AP to transmit the to-be-offloaded service of the cellular network node, and a second resource application that is reported by the AP and used to apply for a WLAN resource in the AP to transmit the conventional WLAN service of the AP; and
determine, according to the first resource application and the second resource application, the first WLAN resource in the AP allocated to the AP and the second WLAN resource in the AP allocated to the cellular network node.

16. The resource allocation node according to claim 11, wherein the resource allocation node further comprises a receiver, and the processor is further configured to:
receive, by using the receiver, first load information that is reported by the cellular network node and corresponding to the service that the cellular network node determines to offload to the AP, and second load information reported by the AP; and
determine, according to the first load information and the second load information, the first WLAN resource in the AP allocated to the AP and the second WLAN resource in the AP allocated to the cellular network node.

17. The resource allocation node according to claim 11, wherein the resource allocation node further comprises a receiver configured to: after the transmitter sends, to the AP, the first message used to indicate the information about the first WLAN resource and the information about the second WLAN resource, receive usage information of the first WLAN resource and the second WLAN resource that is reported by the AP.

18. An access point (AP), comprising:
a memory;
a receiver configured to receive a first message sent by a resource allocation node, wherein the first message is used to indicate information about a first wireless local area network (WLAN) resource and information about a second WLAN resource, the information about the first WLAN resource is information about a WLAN resource in the AP that is allocated to the AP and used to carry a conventional WLAN service of the AP, and the information about the second WLAN resource is information about a WLAN resource in the AP that is allocated to the cellular network node and used to carry a to-be-offloaded service of the cellular network node; and
a processor configured to allocate the first WLAN resource to the conventional WLAN service according to the first message, and allocate the second WLAN resource to the to-be-offloaded service of the cellular network node according to the first message; and transmit the conventional WLAN service and the to-be-offloaded service of the cellular network node according to the allocated resources.

19. A cellular network node, comprising:
a receiver configured to: when it is determined to offload a service of a cellular network node to an access point (AP), receive a second message used to indicate information about a second wireless local area network (WLAN) resource, wherein the information about the second WLAN resource is information about a WLAN resource in the AP that is allocated to the cellular network node and used to carry a to-be-offloaded service of the cellular network node; and
a transmitter configured to send the second message to user equipment (UE), wherein the second message is used by the UE to transmit the service according to the second message, and the UE is UE corresponding to the to-be-offloaded service of the cellular network node.

20. The cellular network node according to claim 19, wherein the transmitter is further configured to send an identity of the UE and convergence layer information of the UE to the AP after the receiver receives the second message used to indicate the information about the second WLAN resource, wherein the convergence layer information is used by the AP to send a data packet corresponding to the to-be-offloaded service of the cellular network node to a corresponding offloading layer of the cellular network node according to the convergence layer information after the data packet is processed, and the offloading layer is an offloading layer indicated by the convergence layer information.

* * * * *